United States Patent
Narvekar et al.

(10) Patent No.: US 11,779,969 B2
(45) Date of Patent: Oct. 10, 2023

(54) APPARATUS AND PROCESS FOR PROCESSING OF GLASS CONTAINERS AND PROCESS FOR MANUFACTURING GLASS CONTAINERS INCLUDING SUCH A PROCESSING

(71) Applicant: SCHOTT POONAWALLA PRIVATE LIMITED, Mumbai (IN)

(72) Inventors: Anil Narayan Narvekar, Goa (IN); Pratul Prakash Potdar, Nani Daman (IN)

(73) Assignee: SCHOTT POONAWALLA PRIVATE LIMITED, Mumbai (IN)

(*) Notice: Subject to any disclaimer, the term of this patent is extended or adjusted under 35 U.S.C. 154(b) by 923 days.

(21) Appl. No.: 16/674,091

(22) Filed: Nov. 5, 2019

(65) Prior Publication Data

US 2020/0147659 A1   May 14, 2020

(30) Foreign Application Priority Data

Nov. 8, 2018  (IN) .............................. 201821042154

(51) Int. Cl.
   *B08B 9/42* (2006.01)
   *B08B 9/08* (2006.01)
   (Continued)

(52) U.S. Cl.
   CPC .............. *B08B 9/42* (2013.01); *B08B 9/0808* (2013.01); *B08B 9/0821* (2013.01); *B65G 17/12* (2013.01);
   (Continued)

(58) Field of Classification Search
   None
   See application file for complete search history.

(56) References Cited

U.S. PATENT DOCUMENTS 5,113,545 A   5/1992  Avelis
5,649,335 A   7/1997  Tye
(Continued)

FOREIGN PATENT DOCUMENTS

CN   102883873 A   1/2013
CN   104149006 A   11/2014
(Continued)

OTHER PUBLICATIONS

Search Report of the GPTO dated Aug. 7, 2019, for corresponding German application No. DE 10 2018 133 145.2.
(Continued)

*Primary Examiner* — Natasha N Campbell
*Assistant Examiner* — Pradhuman Parihar
(74) *Attorney, Agent, or Firm* — Taylor IP, PC

(57) ABSTRACT

An apparatus and process for processing outer surfaces of glass containers (50) for use in pharmaceutical, medical or cosmetic applications, said glass containers (50) having a cylindrical main body (52). The process comprises: providing (S1) a plurality of containers (50); separating individual containers from said plurality of containers (50); and sequentially conveying said individual containers (50) through a processing station (1; 61). In the processing station (1; 61), the individual containers (50) are rotated about a longitudinal axis thereof while outer surfaces of the cylindrical main bodies (52) are in contact with a scrubbing member (27; 30, 35), for reducing an adhesive surface behavior of the outer surfaces of the cylindrical main bodies (52) of the individual containers. In this manner the surface properties of glass containers may be enhanced significantly with a cost-efficient and simple processing to thereby prevent undesired 'stickiness behavior' of the glass containers.

12 Claims, 16 Drawing Sheets

(51) Int. Cl.
*C03B 23/04* (2006.01)
*C03C 23/00* (2006.01)
*B65G 17/12* (2006.01)

(52) U.S. Cl.
CPC .......... *C03B 23/04* (2013.01); *C03C 23/0075* (2013.01); *B65G 2201/0244* (2013.01)

(56) References Cited

U.S. PATENT DOCUMENTS

| | | | |
|---|---|---|---|
| 5,718,030 A * | 2/1998 | Langmack | B08B 9/083 451/241 |
| 2001/0055930 A1* | 12/2001 | Ott | C03C 3/095 65/59.27 |
| 2012/0247512 A1 | 10/2012 | Wu et al. | |
| 2014/0305830 A1 | 10/2014 | Bicker et al. | |
| 2014/0373574 A1 | 12/2014 | Moseler et al. | |
| 2016/0272527 A1 | 9/2016 | Moseler et al. | |

FOREIGN PATENT DOCUMENTS

| | | |
|---|---|---|
| CN | 206689165 | 12/2017 |
| CN | 206912893 U | 1/2018 |
| DE | 19643110 A1 | 4/1998 |
| DE | 202004004560 U1 | 7/2004 |
| GB | 946220 | 1/1964 |
| SU | 134476 A1 | 11/1960 |
| WO | 2008038452 A1 | 4/2008 |
| WO | 2011029857 A2 | 3/2011 |
| WO | 2013149822 A1 | 10/2013 |

OTHER PUBLICATIONS

Christopher L. Timmons et al. "Particulate generation mechanism during bulk filling and mitigation via new class vial", PDA Journal of Pharmaceutical Science and Technology, vol. 71, No. 5, Sep.-Oct. 2017, pp. 379-392.

India Office Action dated Jan. 31, 2022 for India Application No. 201821042154 (6 pages).

Search Report for corresponding Great Britain Application No. GB1916160.3 dated Apr. 29, 2020.

First Office Action in corresponding Russian Application No. 2019135647 dated Nov. 1, 2021 and its English Translation.

Chinese Office Action dated Jul. 19, 2022 for Chinese Application No. 201911088936.3 (8 pages).

* cited by examiner

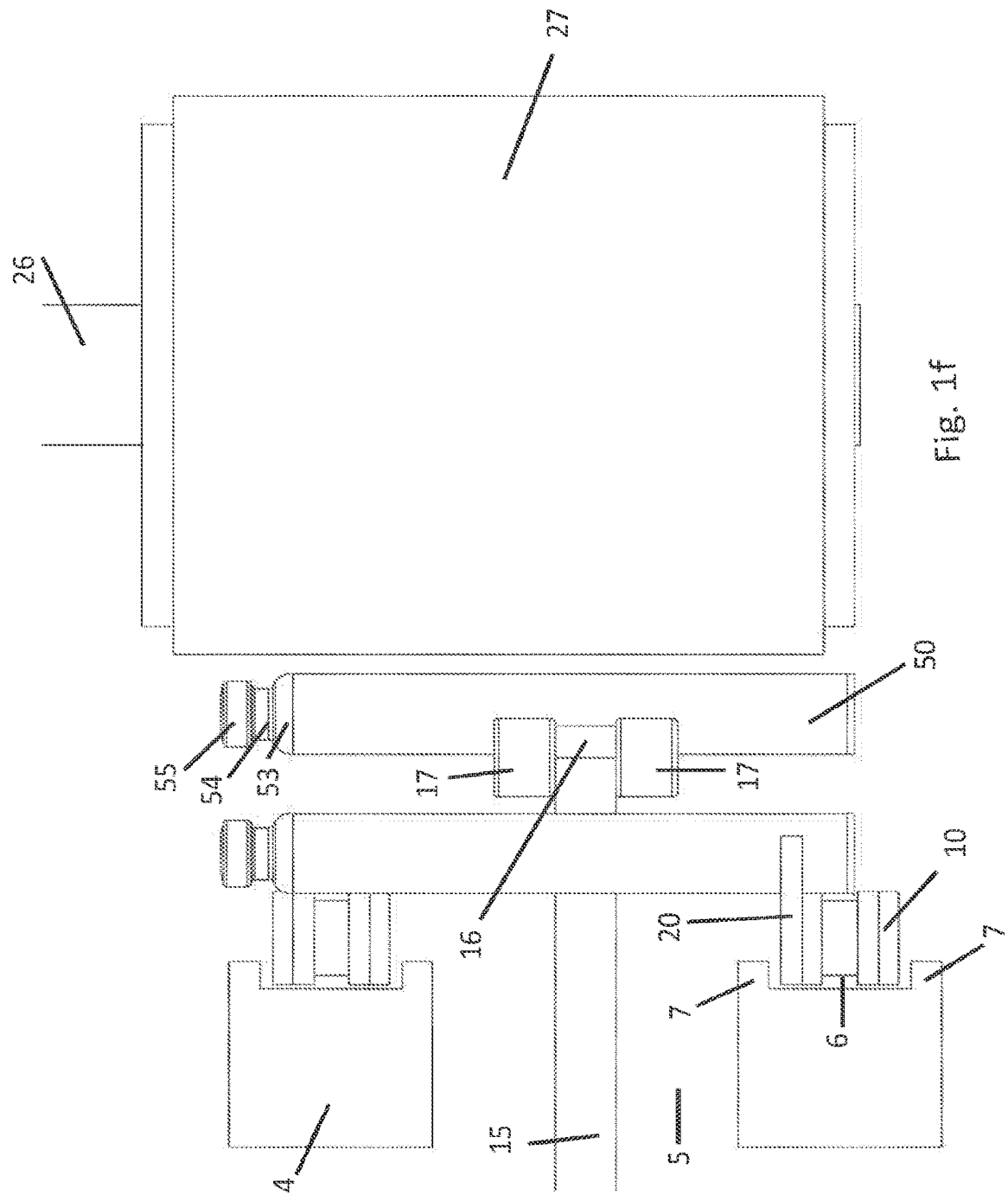

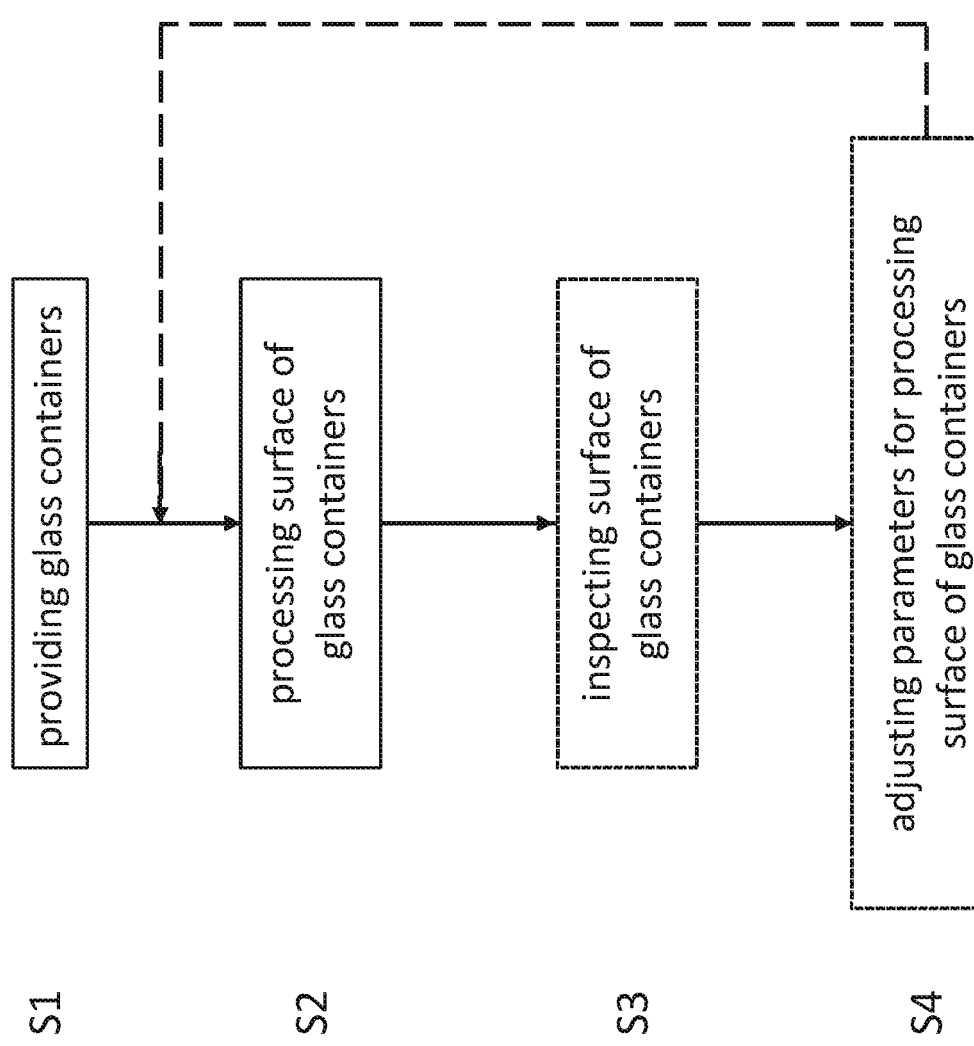

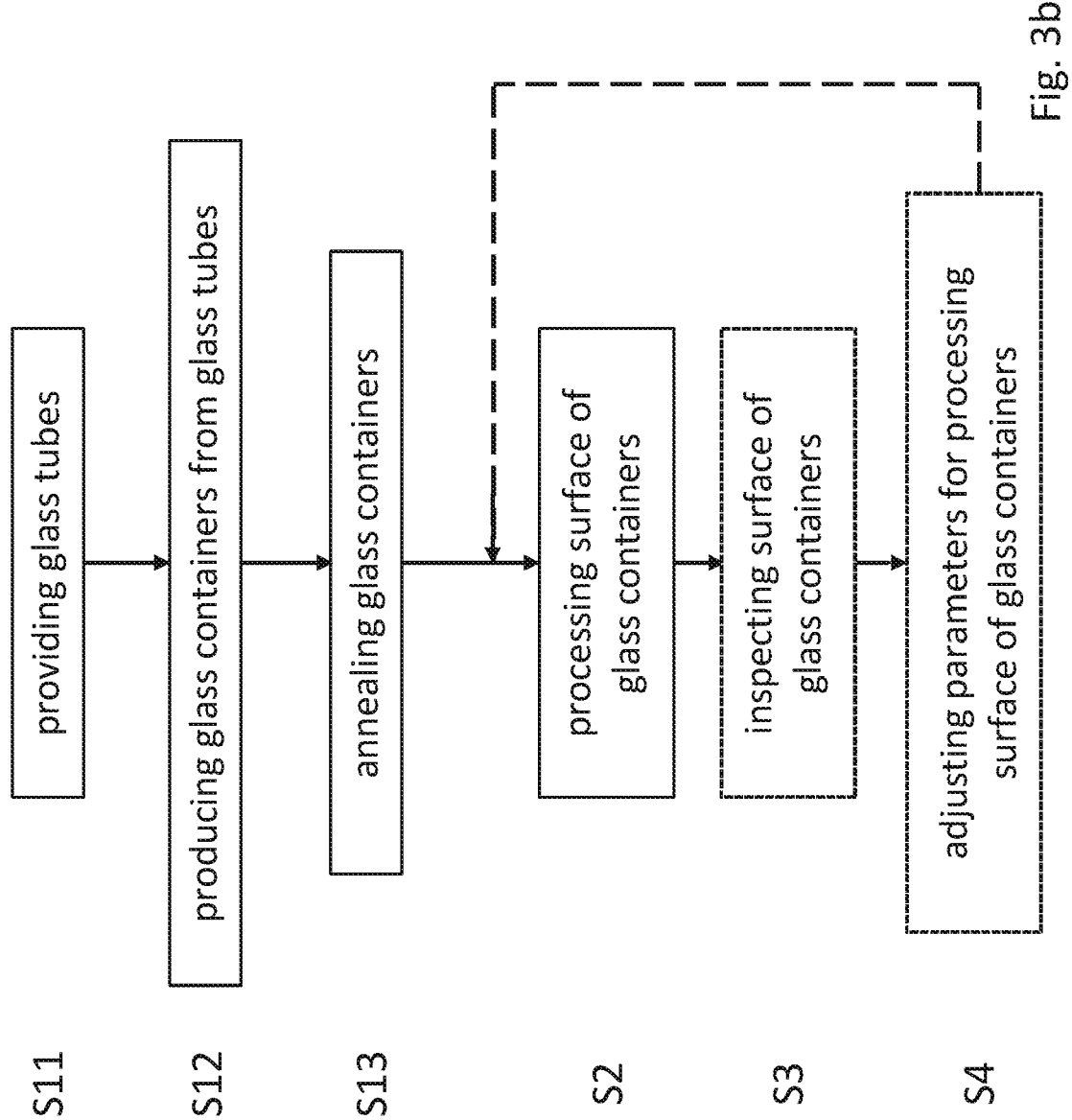

APPARATUS AND PROCESS FOR PROCESSING OF GLASS CONTAINERS AND PROCESS FOR MANUFACTURING GLASS CONTAINERS INCLUDING SUCH A PROCESSING

The present application claims priority of Indian patent application no. 201821042154 "APPARATUS AND PROCESS FOR PROCESSING OF GLASS CONTAINERS AND PROCESS FOR MANUFACTURING GLASS CONTAINERS INCLUDING SUCH A PROCESSING", filed on Nov. 8, 2018, the whole content of which is hereby incorporated by reference.

FIELD OF INVENTION

The invention generally relates to containers that may be part of a pharmaceutical packaging or of a medical device or a sterile packaging, such as syringes, cartridges or cannula systems and pharmaceutical vials, and more particularly to an apparatus and process for processing outer surfaces of such containers for reducing an adhesive surface behavior of the outer surfaces of such containers.

BACKGROUND OF INVENTION

In pharmaceutical packaging, such as syringes, cartridges or cannula systems and pharmaceutical vials, high demands are placed on the friction properties of the inner surface of the packaging. For this purpose, US 2014/0305830 A1 discloses a container, wherein the inner surface contains silicon oxide, and the silicon oxide containing inner surface is at least partially modified with a fluorine containing compound, wherein the fluorine containing compound is chemically bonded to the silicon oxide of the container body via at least one Si—O—Si bond, so that e.g. a syringe plunger or the stopper of a vial can slide over the inner surface of the syringe or vial with the lowest possible friction.

Often, less attention is paid to the properties of the outer surfaces of such containers. It is known that foreign particulate matter continues to be leading cause of parenteral drug recalls and other problems of containers for use in pharmaceutical, medical or cosmetic applications, despite extensive control and inspection during manufacturing, and it is known that glass is a significant source of particulate matter contamination in this field. A major source of such glass particulate matter is a glass-to-glass contact during handling or processing of such containers after manufacturing thereof, particularly also in the filling line of pharmaceutical companies or fillers.

If pharmaceutical packaging made of glass, such as glass tubes, syringes, cartridges or vials are processed for filling with pharmaceuticals or other agents, these are first cleaned, e.g. washed out with 60° hot de-ionized water, possibly with ultrasonic support. If necessary, an additional sterilization step may then be carried out. After such a pre-treatment, the glass products are very blunt, which can mean that they literally 'stick together' on the outside. In filling stations where, for example, glass vials are transported on belts, this can cause an undesired accumulation of containers during bulk processing.

FIG. 7 shows a typical situation of such a bulk processing, where a plurality of containers 100 having cylindrical main bodies are conveyed in permanent glass-to-glass contact on a chute 101 or similar surface. The 'stickiness behavior' of the containers often results in undesired climbing of some of the containers 100 against the others, as shown in FIG. 7, which often may cause the containers to fall off the chute 101 or off a belt (not shown).

In order to simplify handling and reduce abrasion and scrap, it is therefore desirable to specify a process that improves the tribological properties of the outer surfaces, particularly in the case of pharmaceutical packaging made of glass and reduces the susceptibility to scratching as far as possible.

For this purpose, DE 196 43 110 A1 discloses a process for coating the surfaces of hollow glass containers, wherein the hollow glass containers are coated with a solution or dispersion of silane and polyethylene as a coating agent. For this purpose, a solution or dispersion of silane and polyethylene is applied to the surface of the hollow glass container together with a cold finishing agent. Fatty acids, their esters, ester waxes or surfactants are used as cold finishing agents. This treatment of the outer surfaces of the containers increases the costs and often makes it very difficult to comply with nowadays standards in the pharmaceutical industry.

As an alternative WO 2011/029857 A2 discloses a method for treating outer surfaces of pharmaceutical packaging means made of glass. The method includes the steps of applying a liquid that contains oxide particles, especially $SiO_2$ particles, to the surface, and drying the liquid. Alternatively, a liquid containing organically bound silicon, such as silicone oil, can be applied to the surface and then be dried and pyrolytically decomposed in order to deposit $SiO_2$ particles on the surface. The treatment results in improved tribological properties and reduced sensitivity of the containers to scratches.

WO 2013/149822 A2 describes that untreated containers, i.e. not yet sterilized containers, have an oxidation layer consisting essentially of a silicon oxide layer on their outer wall due to the manufacturing process of the containers. During sterilization of the containers, for example in a sterilization tunnel, this oxide layer is destroyed so that the coefficient of friction on the container walls (inside and outside) increases considerably. In addition, it is described that in particular a rapid cooling of the containers can lead to electrostatic charges on the container surfaces, which can lead to impairments in subsequent processes caused by friction and the afore-mentioned 'stickiness behavior'.

To reduce this 'stickiness behavior', WO 2013/149822 A2 proposes adding additional moisture in the form of water, steam or air with high humidity to the containers. It is argued, that the oxidation process starts again when the containers cool down on their walls, so that an oxidation layer reducing friction is formed. Only the outer surfaces of the containers are wetted in this process with the moisture, for preventing the already sterilized and depyrogenated containers from becoming contaminated by the moisture entering the container interior.

Christopher L. Timmons, Chi Yuen Liu and Stefan Merkle, 'Particulate generation mechanism during bulk filling and mitigation via new class vial', PDA Journal of Pharmaceutical Science and Technology, Vol. 71, No. 5, September-October 2017, discusses the properties of strengthened glass vials having a low coefficient of friction (COF) for reducing product contamination and the frequency of required filling line interventions.

Accordingly, there exists a persistent need in the field of pharmaceutical packaging and glass containers for use in pharmaceutical, medical or cosmetic applications for efficient, low-cost and flexible processes for providing glass containers having a reduced adhesive surface behavior ('stickiness behavior').

SUMMARY OF INVENTION

It is an object of the present invention to provide an efficient, low-cost and flexible process and an apparatus for providing glass containers for use in pharmaceutical, medical or cosmetic applications having a reduced adhesive surface behavior ('stickiness behavior').

According to the present invention there is provided a process for processing outer surfaces of glass containers for use in pharmaceutical, medical or cosmetic applications, said glass containers having a cylindrical main body, said process comprising: providing a plurality of containers; separating individual containers from said plurality of containers; and sequentially conveying said individual containers through a processing station; wherein in the processing station, said individual containers are rotated about a longitudinal axis thereof while the outer surfaces of the cylindrical main bodies are in contact with a scrubbing member, for reducing an adhesive surface behavior of the outer surfaces of the cylindrical main bodies of the individual containers.

The direct contact of the outer surfaces of the rotating glass containers with the scrubbing member enables a swift scrubbing or polishing effect, which surprisingly turned out to be sufficient to significantly reduced the 'stickiness behavior' of the glass containers and reducing an adhesive surface behavior of the outer surfaces of such containers. For this purpose, the outer surfaces of the glass containers may simply roll on the scrubbing member without slippage, the friction between the outer surfaces of the glass containers and the scrubbing member being sufficient to properly enhance the surfaces properties of the glass containers. However, according to further embodiments a certain slippage between the outer surfaces of the glass containers and the scrubbing member may prevail to thereby increase the scrubbing or polishing effect of the outer surfaces of the glass containers even more.

Another advantage of the process according to the present invention is a significant reduction of the risk of scratches due to reduced surface abrasion. If the containers should collide during storage, transport or conveyance despite measures taken to avoid a collision or direct contact between adjacent containers of a plurality of containers, the risk of scratches will be reduced due to the reduced surface abrasion caused by the process according to the present invention.

The duration of the rotation of the glass containers, characteristics of the scrubbing member and characteristics of the contact between the scrubbing member and the outer surface of a glass container represent parameters that can be easily adjusted and modified in accordance with the surface properties of the glass containers, to thereby ensure a consistent and proper reduction of the 'stickiness behavior' of the glass containers. Furthermore, it turned out that the process according to the present invention can be easily integrated into existing production or processing facilities used for producing or processing glass containers for medical, pharmaceutical or cosmetic purposes. E.g. the process according to the present invention may be performed after annealing the glass containers in an annealing lehr, or directly before further processing the containers in bulk format and with direct glass-to-glass contact, such as conveying a plurality of containers on a chute while standing upright on a guiding surface of the chute.

According to a further embodiment the individual containers are rotated several times about their longitudinal axis while the outer surfaces of the cylindrical main bodies are in contact with the scrubbing member. The number of rotations of the glass containers can be easily adjusted for enabling a proper surface treatment of the glass containers to ensure desired surface properties of the glass containers.

According to a further embodiment rotation of the individual containers about their longitudinal axis while the outer surfaces of the cylindrical main bodies are in contact with the scrubbing member is stabilized, for avoiding a direct glass-to-glass contact of adjacent glass containers during processing and for avoiding an undesired tilting of the rotational axes of the glass containers during their processing. Stabilization is effected by cooperation of a scrubbing member with the glass containers to be processed, which is suited for preventing a collision of directly adjacent glass containers in the region of processing while these directly adjacent glass containers are processed over a period envisaged for properly processing the outer surfaces of these glass containers.

The rotation of the glass containers about their longitudinal axes may be stabilized by means of positioning and guiding members, such as notches, grooves or V-shaped supporting members used for conveying the glass containers through the processing apparatus, said positioning and guiding members firmly defining a predetermined orientation and position of the glass containers during processing. Particularly the guiding and positioning effect of the positioning and guiding members may also be used for precisely defining the contact and contact pressure between the scrubbing member used for scrubbing or polishing the outer surfaces and the glass containers.

According to a further embodiment the rotation of the individual containers about their longitudinal axis is stabilized by a gap formed between the scrubbing member and at least one counter member, wherein a width of the gap corresponds to an outer diameter of the individual containers, wherein the at least one counter member contacts the outer surfaces of the individual containers at two or more contact points on the outer surfaces spaced apart along the longitudinal axis of the containers. In this configuration, the counter member acts as the afore-mentioned positioning and guiding member. At the same time the counter member may be used for electrically grounding the glass containers during processing to thereby reduce electrostatic charging caused by friction between the scrubbing member and the glass container. Particularly, the counter member may be made of a suitable rubber or plastic material, particularly of a silicon or PU (polyurethane) material, sponge or foam.

According to a further embodiment the scrubbing member is formed by a driven roller and the individual containers are supported on two idle rollers or two pairs of idle rollers disposed in a V-shaped configuration along the circumference of the driven roller, each idle roller or pair of idle rollers forming a gap having a width corresponding to the outer diameter of the individual containers. The two idle rollers or two pairs of idle rollers stabilize the rotation of the glass containers about their longitudinal axes during processing. By adjusting the positions and orientation of the two idle rollers or of the two pairs of idle rollers the characteristics of the scrubbing or polishing effect during processing may be adjusted conveniently, particularly an orientation of the glass containers exactly in parallel with the rotating polishing cylinder and at a suitable distance as well as a proper contact pressure of the polishing cylinder onto the glass containers may be adjusted easily and precisely.

According to a further embodiment the step of sequentially conveying said individual containers through the processing station comprises: disposing the individual containers in grooves of guiding members and conveying the guiding members with the individual containers disposed thereon through the processing station in a clocked cycle, wherein the two idle rollers or two pairs of idle rollers are commonly supported on a lifting arm, and the lifting arm lifts the individual containers in synchronism with the clocked cycle to bring the outer surfaces of the cylindrical main bodies of the individual containers in contact with the scrubbing member for processing.

According to a further embodiment the individual containers are conveyed through the processing station in a horizontal orientation, which helps to avoid intrusion of particulate matter into the interiors of the glass containers during processing.

According to a further embodiment the rotation of the individual containers about their longitudinal axis is driven and stabilized by conveying the individual containers through a channel formed between a driven belt and the at least one counter member, said at least one counter member being plate-shaped, said channel having a height corresponding to a length of the cylindrical main bodies of the individual containers and having a width corresponding to the outer diameter of the individual containers. In this configuration the individual containers may also be conveyed through the processing station in a vertical orientation, i.e. in an upright position, with an open end being directed vertically upward or downward. In this embodiment the glass containers continuously roll through the nip formed by the channel, in contact with the driven belt and the at least one counter member. As already outlined above related to the first embodiment, a certain degree of slippage may prevail between the driven belt and the at least one counter member as well.

According to a further embodiment the driven belt is driven by engagement of a toothed drive pulley with axial grooves provided on an inner surface thereof and wherein at least two idle pulleys form a linear portion of the channel, wherein said at least one counter member is disposed in parallel with the linear portion of the channel.

According to a further embodiment the width of the gap formed between the scrubbing member and at least one counter member is adjusted by adjustment members, to thereby precisely adjust the conditions of the processing of the outer surfaces of the glass containers, such as scrubbing or polishing effect, contact pressure and the like.

According to a further embodiment the process further comprises: determining the adhesive surface behavior of the outer surfaces of the cylindrical main bodies of the individual containers in a quantitative or qualitative manner; and adjusting the width of the gap formed between the scrubbing member and at least one counter member and/or a contact pressure of the scrubbing member and/or at least one counter member contacting the outer surfaces of the cylindrical main bodies in the processing station in correspondence with a result of the step of determining the adhesive surface behavior of the outer surfaces of the cylindrical main bodies of the individual containers in a quantitative or qualitative manner. In this manner a certain feedback may be provided that may be used for properly adjusting the conditions of the processing of the outer surfaces of the glass containers, such as duration, scrubbing or polishing effect, contact pressure and the like. In this manner a consistent quality with proper 'stickiness behavior' of the glass containers can be ensured.

According to a further embodiment an outer surface of the scrubbing member is made of rubber or plastic material, particularly of a silicon or PU (polyurethane) material, sponge or foam.

According to a further embodiment in the step of sequentially conveying said individual containers through the processing station the individual containers are disposed in parallel with each other and at a constant spacing, particularly for avoiding an undesired glass-to-glass contact between adjacent glass containers during processing.

According to a further embodiment, the process further comprises: spraying electric charges on the outer surfaces of the individual containers using an ionizer, for ensuring a neutral electric charge of the individual containers after processing.

According to a further embodiment, the process further comprises: removing particles from the processing station using a vacuum pump, for preventing intrusion of particles removed from the outer surfaces of the individual containers into the interior of the containers.

According to a further aspect of the present invention there is provided a process for manufacturing glass containers for use in pharmaceutical, medical or cosmetic applications, said glass containers having a cylindrical main body, said process comprising: providing glass tubes; producing a plurality of glass containers from said glass tubes by hot forming; and processing outer surfaces of the plurality of glass containers, which comprises: separating individual containers from said plurality of containers; and sequentially conveying said individual containers through a processing station; wherein in the processing station, said individual containers are rotated about a longitudinal axis thereof while outer surfaces of the cylindrical main bodies are in contact with a scrubbing member, for reducing an adhesive surface behavior of the outer surfaces of the cylindrical main bodies of the individual containers.

According to a further embodiment the process for manufacturing glass containers further comprises the steps of the process for processing outer surfaces of glass containers as outlined above and herein under.

According to a further aspect of the present invention there is provided an apparatus for processing outer surfaces of glass containers for use in pharmaceutical, medical or cosmetic applications, said glass containers having a cylindrical main body, said apparatus comprising: a processing station for processing the outer surfaces of the glass containers; an inlet for receiving a plurality of containers, configured for separating individual containers from said plurality of containers; an outlet for outputting the individual containers after processing of the outer surfaces in the processing station; and a conveying device configured for sequentially conveying said individual containers through the processing station from the inlet to the outlet. According to the present invention the processing station comprises a scrubbing member and a driving device for driving a rotation of the individual containers about a longitudinal axis thereof while outer surfaces of the cylindrical main bodies are in contact with the scrubbing member, for reducing an adhesive surface behavior of the outer surfaces of the cylindrical main bodies of the individual containers.

According to a further embodiment, the individual containers are rotated several times about their longitudinal axis while the outer surfaces of the cylindrical main bodies are in contact with the scrubbing member.

According to a further embodiment, a gap is formed between the scrubbing member and at least one counter member, for stabilizing rotation of the individual containers about their longitudinal axis while the outer surfaces of the cylindrical main bodies are in contact with the scrubbing member, wherein a width of the gap corresponds to an outer diameter of the individual containers, wherein the at least one counter member contacts the outer surfaces of the individual containers at two or more contact points on the outer surfaces spaced apart along the longitudinal axis of the containers.

According to a further embodiment, the scrubbing member is formed by a driven roller and the individual containers are supported on two idle rollers or two pairs of idle rollers disposed in a V-shaped configuration along the circumference of the driven roller, each idle roller or pair of idle rollers forming a gap having a width corresponding to the outer diameter of the individual containers.

According to a further embodiment, the conveying device comprises two conveyor chains guided through the processing station spaced apart and in parallel with each other, guiding members having V-shaped grooves are linked with the conveyor chains, and the two conveyor chains are driven in a clocked cycle, for sequentially conveying said individual containers through the processing station with the individual containers being disposed in the V-shaped grooves of the guiding members in a clocked cycle, wherein the two idle rollers or two pairs of idle rollers are commonly supported on a lifting arm, and the lifting arm is controlled for lifting the individual containers in synchronism with the clocked cycle to bring the outer surfaces of the cylindrical main bodies of the individual containers in contact with the scrubbing member for processing.

According to a further embodiment, the conveying device is configured for conveying the individual containers through the processing station in a horizontal orientation.

According to a further embodiment, the scrubbing member and at least one counter member disposed opposite to the scrubbing member together form a channel for driving and stabilizing rotation of the individual containers about their longitudinal axis while the individual containers are conveyed through the channel, said at least one counter member being plate-shaped, said channel having a height corresponding to a length of the cylindrical main bodies of the individual containers and having a width corresponding to the outer diameter of the individual containers.

According to a further embodiment, the conveying device further comprises a toothed drive pulley and axial grooves are provided on an inner surface of said driven belt for driving the driven belt by engagement of the toothed drive pulley with the axial grooves provided on the inner surface of the driven belt, wherein at least two idle pulleys form a linear portion of the channel and said at least one counter member is disposed in parallel with the linear portion of the channel.

According to a further embodiment, the apparatus further comprises adjustment members for adjusting the width of the gap formed between the scrubbing member and the at least one counter member.

According to a further embodiment, the apparatus further comprises: an inspection system for determining the adhesive surface behavior of the outer surfaces of the cylindrical main bodies of the individual containers in a quantitative or qualitative manner and outputting an output signal corresponding to the adhesive surface behavior of the outer surfaces of the cylindrical main bodies of the individual containers; and a processing unit configured for controlling the adjustment members, for adjusting the width of the gap formed between the scrubbing member and at least one counter member and/or for adjusting a contact pressure of the scrubbing member and/or at least one counter member contacting the outer surfaces of the cylindrical main bodies in the processing station in correspondence with the output signal.

According to a further embodiment, an outer surface of the scrubbing member is made of rubber or plastic material, particularly of a silicon or PU (polyurethane) material, sponge or foam.

According to a further embodiment, the apparatus further comprises an ionizer for spraying electric charges on the outer surfaces of the individual containers, for ensuring a neutral electric charge of the individual containers after processing.

According to a further embodiment, the apparatus further comprises a vacuum pump for removing particles from the processing station, for preventing intrusion of particles removed from the outer surfaces of the individual containers into the interior of the containers.

OVERVIEW ON DRAWINGS

Hereinafter, the present invention will be disclosed in exemplary manner and with reference to the drawings, wherein:

FIGS. 1a to 1f show an apparatus for processing outer surfaces of glass containers for use in pharmaceutical, medical or cosmetic applications according to a first embodiment of the present invention in various views;

FIG. 3a shows a process for processing outer surfaces of glass containers for use in pharmaceutical, medical or cosmetic applications according to the present invention;

FIG. 3b shows a process for manufacturing glass containers for use in pharmaceutical, medical or cosmetic applications including the process for processing the outer surfaces of glass containers of FIG. 3a;

Figure 6B:
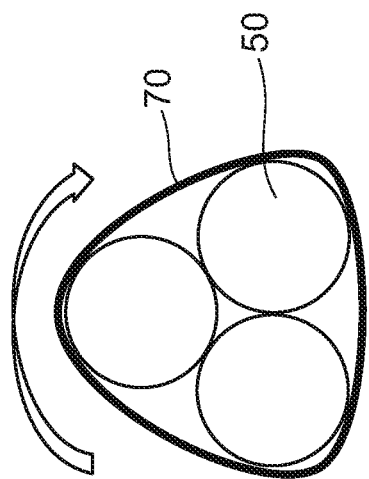
Figure 6A:
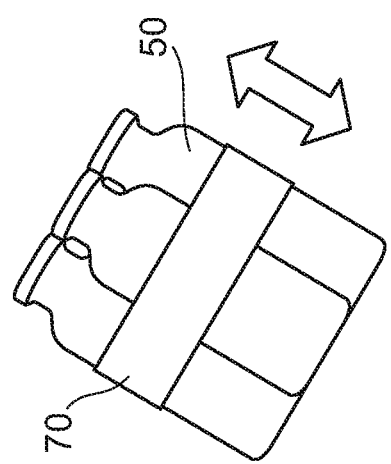
Figure 6C:
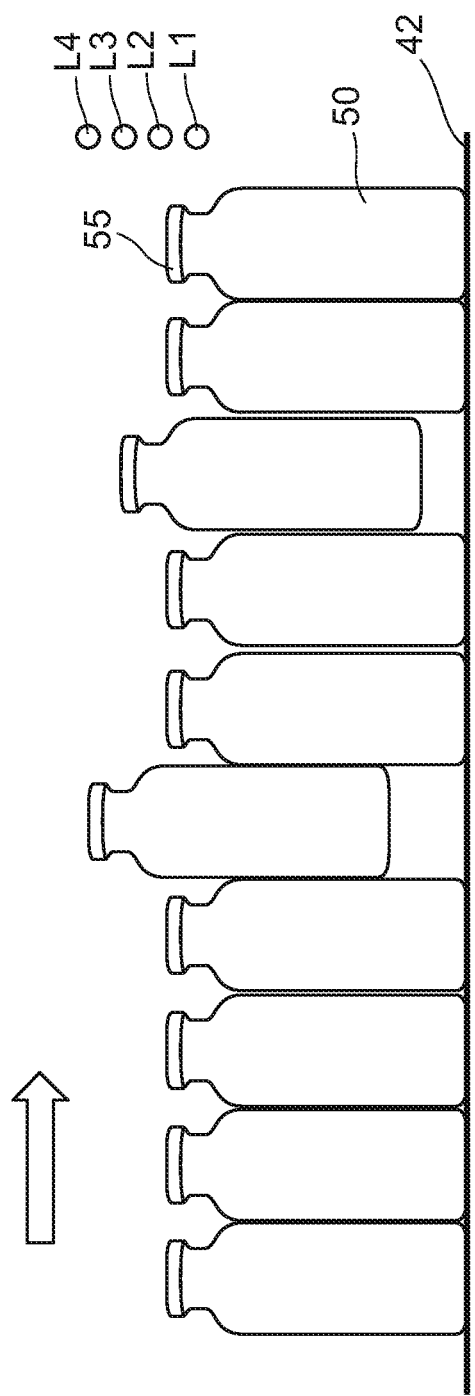
Figure 7:
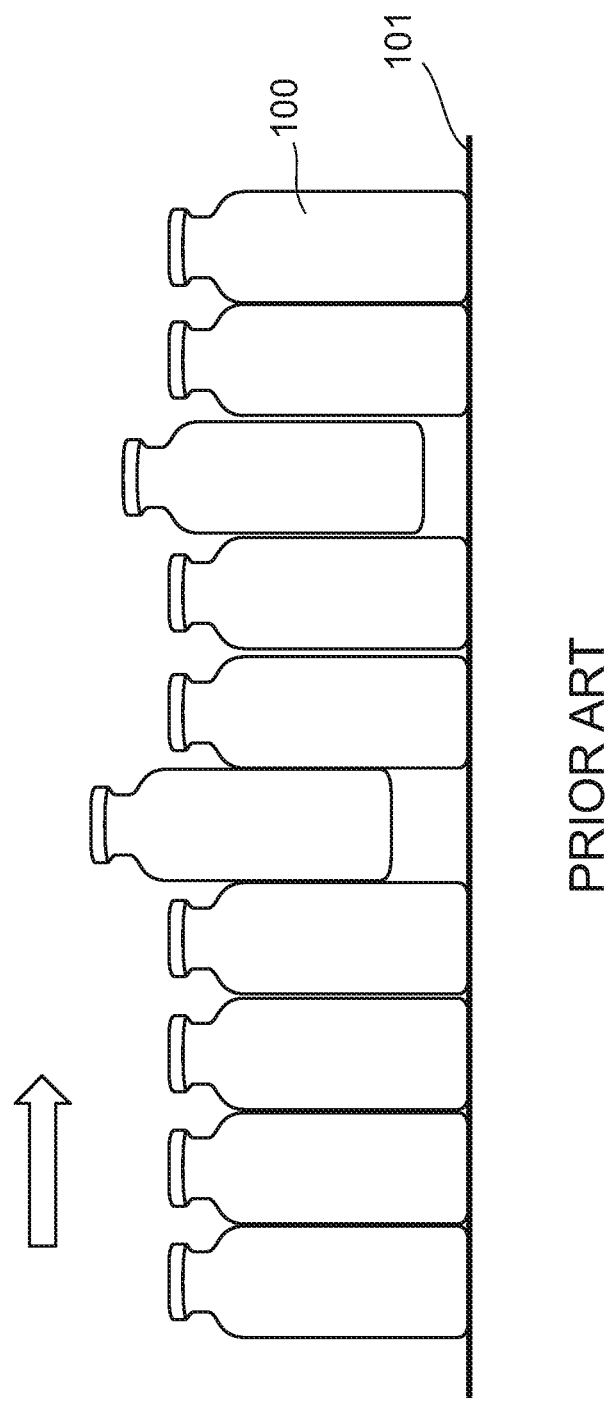

FIGS. 6a to 6c summarize different methods used in an inspection system for determining the adhesive surface behavior of the outer surfaces of glass containers in a quantitative or qualitative manner and outputting a corresponding output signal for use in a further embodiment of the process according to the present invention; and FIG. 7 shows the result of the 'stickiness behavior' of glass containers during bulk processing with glass-to-glass contact.

Throughout the drawings, the same reference numerals designate identical or substantially the same components or groups of components.

DETAILED DESCRIPTION OF PREFERRED EMBODIMENTS

Figure 5:
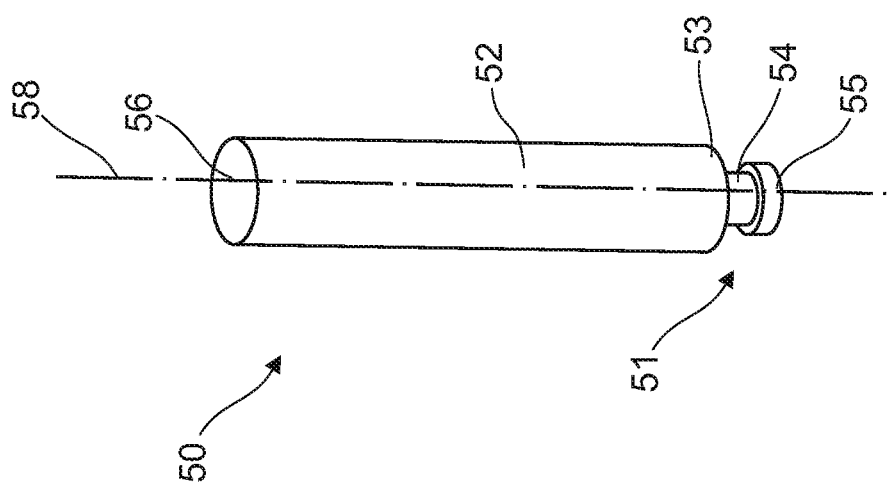
FIG. 5 shows the general geometry of a typical glass container for use in pharmaceutical, medical or cosmetic applications, to be processed by the process according to the present invention.

FIG. 5 shows the general geometry of a typical glass container (hereinafter 'container') 50 for use in pharmaceutical, medical or cosmetic applications, to be processed by the process according to the present invention. In this example, the container 50 is embodied as a glass cartridge. The present invention is, however, not limited to cartridges. Other examples of glass containers in the sense of the present invention may be glass vials.

The container 50 comprises a cylindrical body 52 having an outer diameter, which is larger than the outer diameter of all other portions of the container 50. The cylindrical body 52 merges into a necked portion 51 at the bottom end of a reduced diameter, which comprises a shoulder portion 53, a neck 54, representing the portion of the container 50 of minimum outer diameter, and a widened bottom rim 55 with a secondary opening used for drug administering. The container 50 is filled via a filling opening 56 at an opposite upper end.

Such cartridges, including pen cartridges, by-pass cartridges and dental cartridges, are a commonly-used packaging solution for drug delivery systems, e.g. insulin administration, pen systems, pump systems, auto-injectors and needle free injectors. For special requirements such as by-pass and chemically strengthened cartridges, personalized designs are available on the market. Cartridges available on the market may be made of glass material, particularly of Fiolax® glass from SCHOTT AG, and offer fixed volumes for drug delivery of e.g. 1.0 ml, 1.5 ml and 3.0 ml. Different volumes usually correspond to different axial lengths of the cartridges.

As will become apparent from FIG. 5, the cylindrical main body 52 extends over the major part of the axial length of the container 50. The container 50 has a rotational symmetry about a center line 58 indicated by a dashed line in FIG. 5. When rotated about this center line 58 as a rotational axis, the outmost contour of the container 50 corresponds to the outer surface of the cylindrical main body 52. This also holds for other containers 50 in the sense of the present application, e.g. glass vials.

Figure 1A:
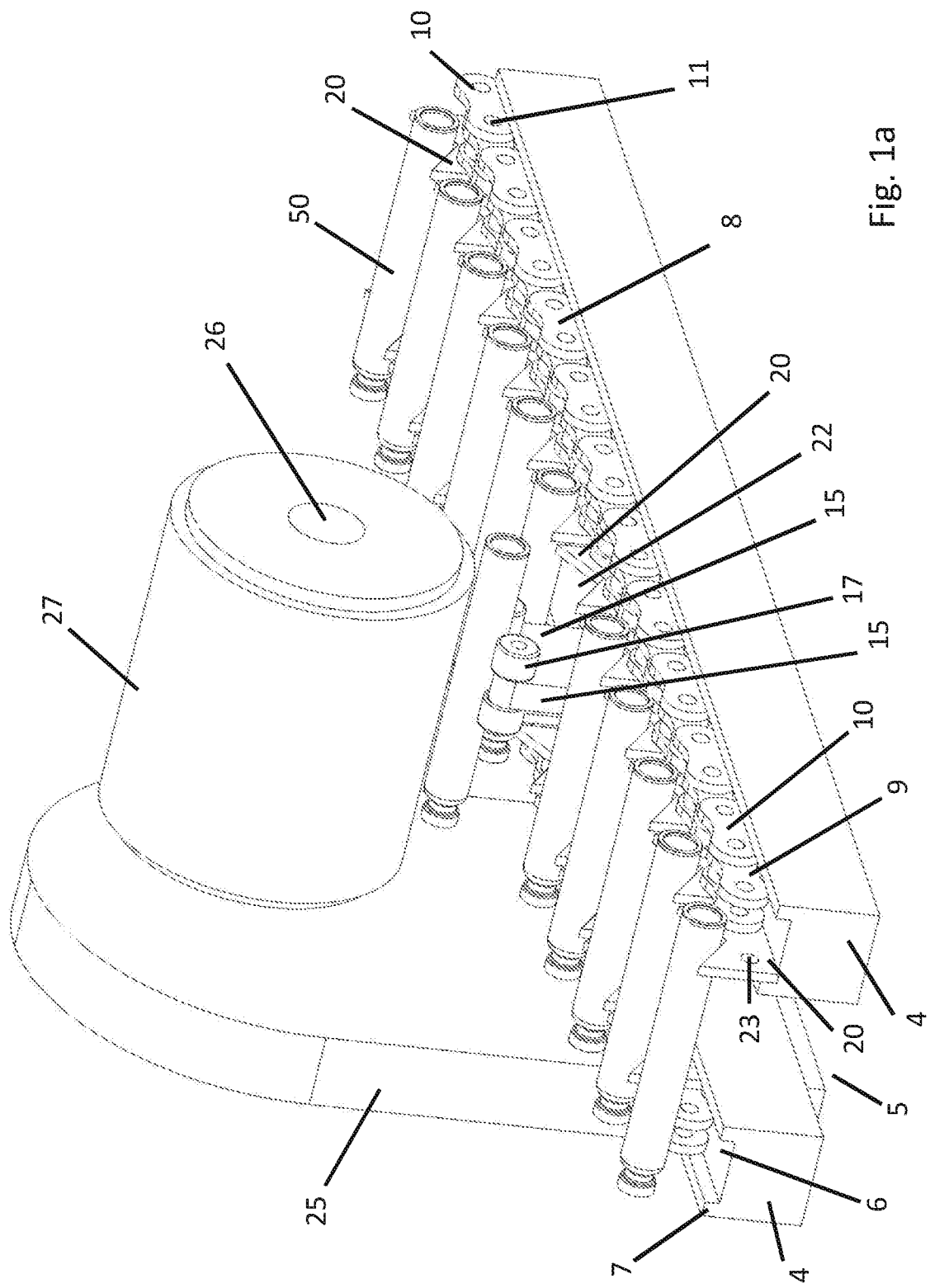
Figure 1B:
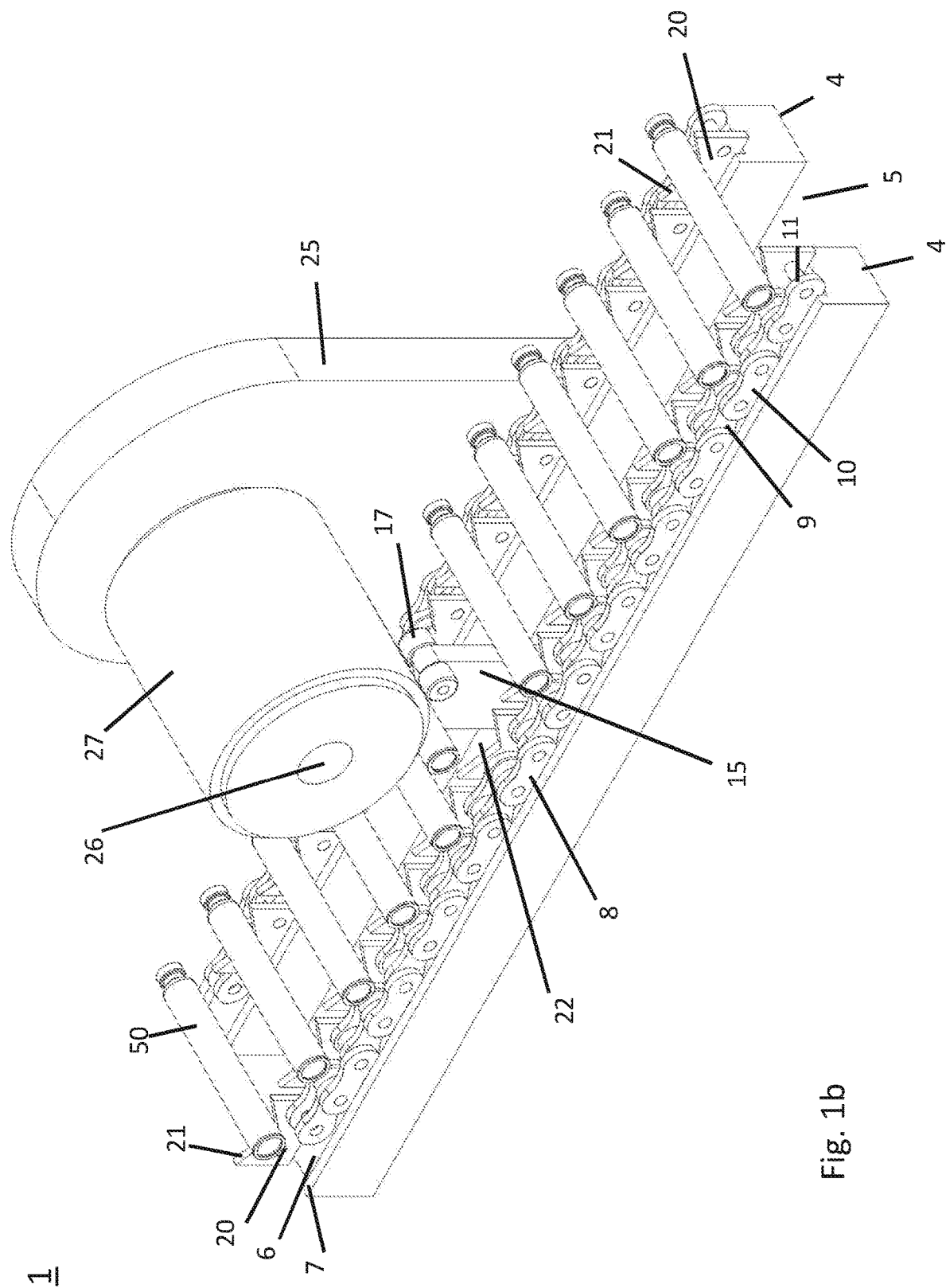

FIGS. 1a and 1b show an apparatus 1 for processing outer surfaces of glass containers for use in pharmaceutical, medical or cosmetic applications according to a first embodiment of the present invention in two perspective top views. The apparatus 1 generally consists of conveying device, in this embodiment a conveyor chain 8, configured for sequentially conveying said individual containers 50 past a polishing cylinder 27 used as a scrubbing member for scrubbing or polishing the outer surfaces of the individual containers 50, particularly the outer surfaces of the cylindrical main portions 52 (cf. FIG. 5).

The polishing cylinder 27 is rotatably supported by a drive shaft 26, which is supported by the holding arm 25 and driven by an electric motor (not shown) for rotating about drive shaft 26. The polishing cylinder 27 has a cylindrical shape and is rotationally symmetric about drive shaft 26. The drive shaft 26 and the polishing cylinder 27 are arranged exactly in parallel with the longitudinal axes of the containers 50 conveyed past the polishing cylinder 26.

Each container 50 is supported on two supporting members 20 having V-shaped indentations 22. The supporting members 20 are mounted to outer chain links 10 of the conveyor chain 8 via chain pins 11 and pin holes 23. The two supporting members 20 are each supported in such a manner by the conveyor chain 8 that a line connecting the bottom-most portions of the V-shaped indentations 22 of two opposite supporting members 20 is exactly in parallel with the drive shaft 26 and the axial direction of the polishing cylinder 27. Adjustment members (not shown) may be provided to ensure this exact alignment, particularly for tilting the drive shaft 26 and polishing cylinder 26 relative to the containers 50, but also to adjust the distance between the polishing cylinder 26 and the container 50 to be processed.

The two conveyor chains 8, consisting of outer chain links 10 and inner chain links 9 connected with each other via chain pins 11, are guided along longitudinal recesses 6 formed on the upper sides of guiding blocks 4, which extend spaced apart from and in parallel with each other in horizontal direction. More specifically, the outer chain links 10 and supporting members 20 of the conveyer chains 8 are precisely guided in a longitudinal direction past the polishing cylinder 27 in abutment with the guiding protrusions 7. The outer chain links 10 and supporting members 20 of the two conveyer chains 8 are driven in exact synchronism so that the containers 50 remain aligned in parallel with the drive shaft 26 in all stages of processing.

A longitudinal gap 5 is formed between the two guiding blocks 4, which is spanned by the containers 50 when supported by the supporting members 20. More specifically, the cylindrical main bodies 52 of the containers 50 are supported by the V-shaped indentations 22 of the supporting members 20.

Below the polishing cylinder 27 a lifting arm 15 is disposed, on which two pairs of idle rollers 16 are supported by shafts 16. More specifically, the rollers 16 of each pair of rollers 16 is supported on opposite sides of the lifting arm 15. The two pairs of rollers 16 are supported exactly in parallel with each other, so that the containers 50 are exactly aligned in parallel with the drive shaft 26 and the polishing cylinder 27, when supported by the two pairs of rollers 16.

The lifting arm 16 is used for lifting the container 50 positioned below the polishing cylinder 27 and removing this container 50 from the V-shaped indentations 22 of the supporting members 20. In the raised condition, the container 50 is only supported by the two pairs of rollers 16. In the raised position shown in FIGS. 1a and 1b, the container 50 is lifted to such an extent, that the cylindrical main body 52 is in contact with and pushed against the polishing cylinder 27. In this position, the rotating polishing cylinder 27 scrubs or polishes the outer surface of the cylindrical main body 52 of the container 50, for reducing an adhesive surface behavior of the outer surface of the cylindrical main body 52 of the container 50.

In a typical processing, the polishing cylinder 27 rotates at a relatively high rotational speed about drive shaft 26, resulting in a high rotational acceleration of the container 50, which initially does not rotate when conveyed and lifted to get in contact with the polishing cylinder 27. This may result in a certain slippage of the container 50, causing an efficient scrubbing or polishing of the cylindrical main body 52 of the container 50. The characteristics of this slippage and scrubbing or polishing effect may depend on parameters, such as contact pressure of the container 50 against the polishing cylinder 27, the material of the polishing cylinder 27, the material of the rollers 16, the rotational speed of the polishing cylinder 27 and its variation over time. Preferably, the cylindrical main body 52 of the container 50 does not slip on the rollers 16. In a typical processing, the containers 50 are rotated several times about their center axis while being in contact with the polishing cylinder 27. After the scrubbing or polishing, the lifting arm 15 is lowered again to release the contact of the cylindrical main body 52 of the container 50 and the polishing cylinder 27 and dispose the container 50 again in the V-shaped indentations 22 of the supporting members 20.

The conveyor chains 8 may be moved in a clocked cycle consisting of short movement intervals interrupted by standstill intervals, during which the containers 50 are lifted for processing. As an alternative, the conveyor chains 8 may be moved continuously in longitudinal direction, in which case the holding arm 25 and polishing cylinder 27 are moved in exact synchronism with the conveyor chains 8 in longitudinal direction while the lifting arm 15 has raised a container to the raised condition in contact with the polishing cylinder 27, and perform a reciprocating movement in synchronism with the lifting and lowering of the lifting arm 15 and container 25.

Figure 1C:
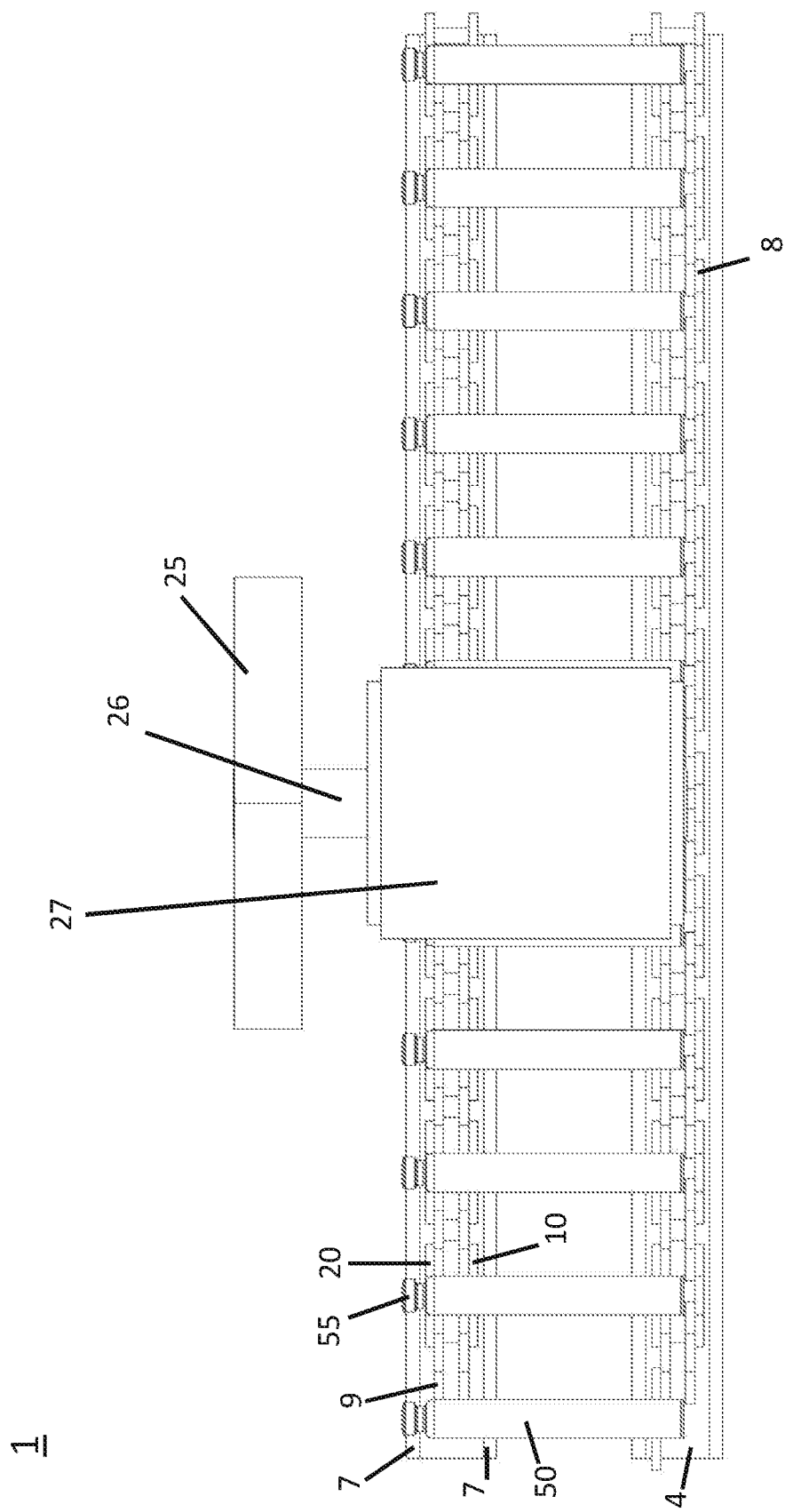
Figure 1D:
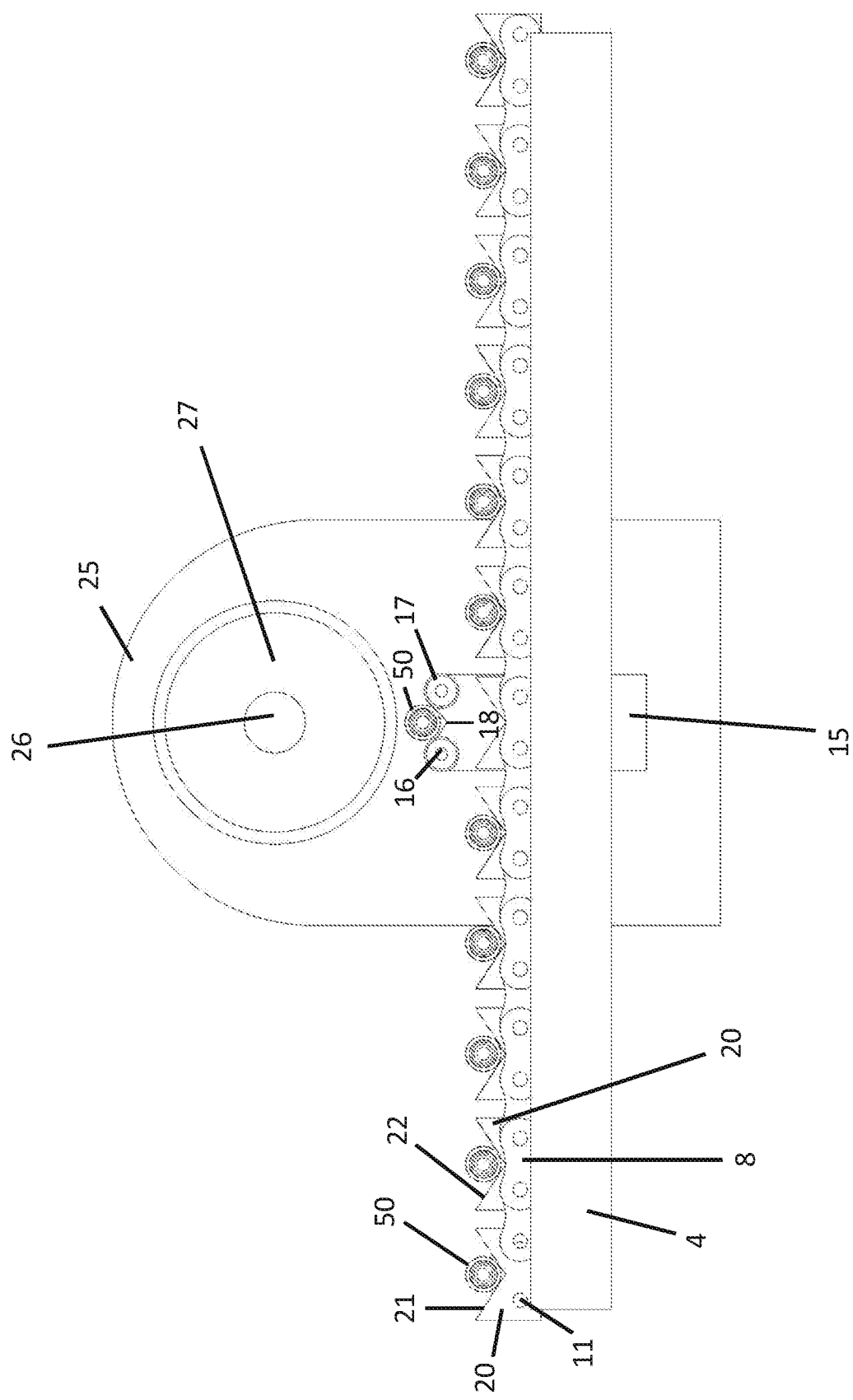
Figure 1E:
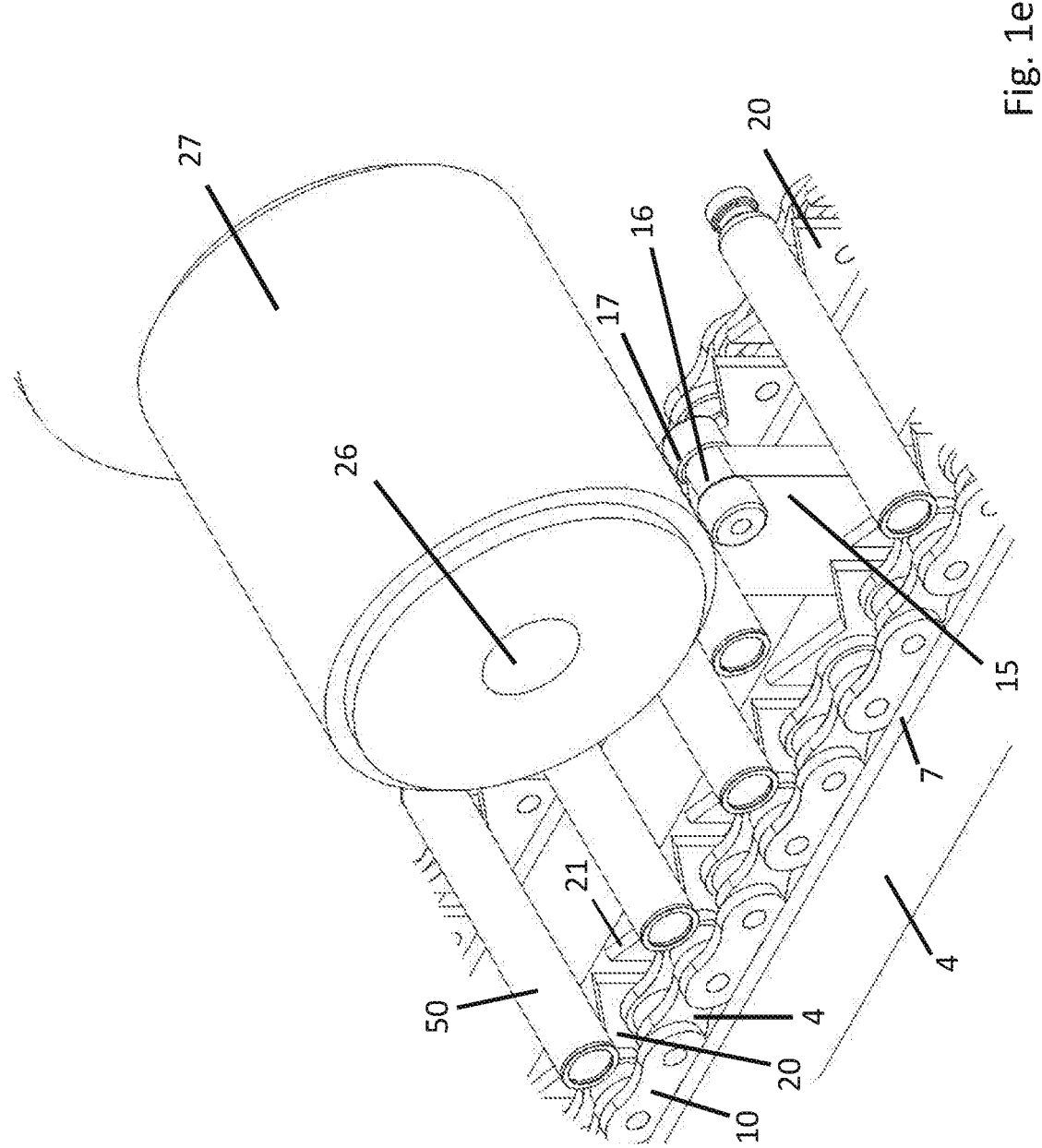

FIG. 1c shows the apparatus 1 in a top view. FIG. 1d shows the apparatus 1 in a side view. FIG. 1e is a perspective view at a magnified scale of the apparatus 1 in a raised position of the lifting arm 15, for bringing an individual container 50 in contact with the polishing cylinder 27 for processing. FIG. 1f shows the apparatus 1 in a cross-sectional view, shortly before the lifting arm 15 has reached the raised position for bringing the individual container 50 in contact with the polishing cylinder 27 for processing.

As will become apparent to the skilled person, the two conveyor chains 8 may be replaced by rubber belts, particularly V-ribbed belts, which are moved in perfect synchronism to ensure a proper alignment of the containers 50 when conveyed past the polishing cylinder 27. Furthermore, the polishing cylinder 27 may be stationary and non-rotating, whereas the idle rollers 17 may be replaced by driven rollers for rotating the containers 50 in contact with the polishing cylinder 27. Also, each pair of relatively short rollers 17, shown e.g. in FIG. 1f, may be replaced by a relatively long single roller.

Figure 2A:
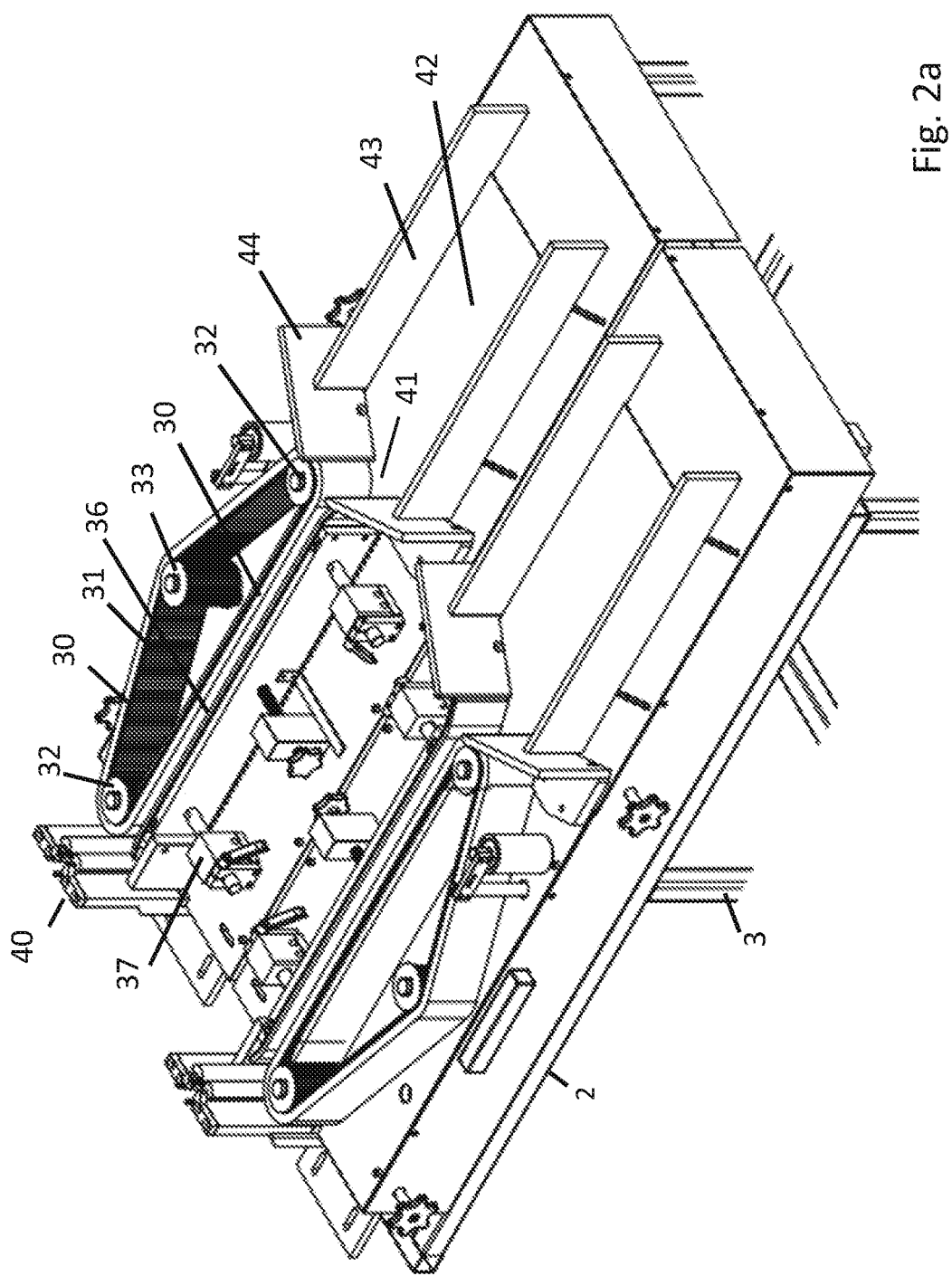
FIGS. 2a to 2c show an apparatus for processing outer surfaces of glass containers for use in pharmaceutical, medical or cosmetic applications according to a second embodiment of the present invention in various views.
Figure 2B:
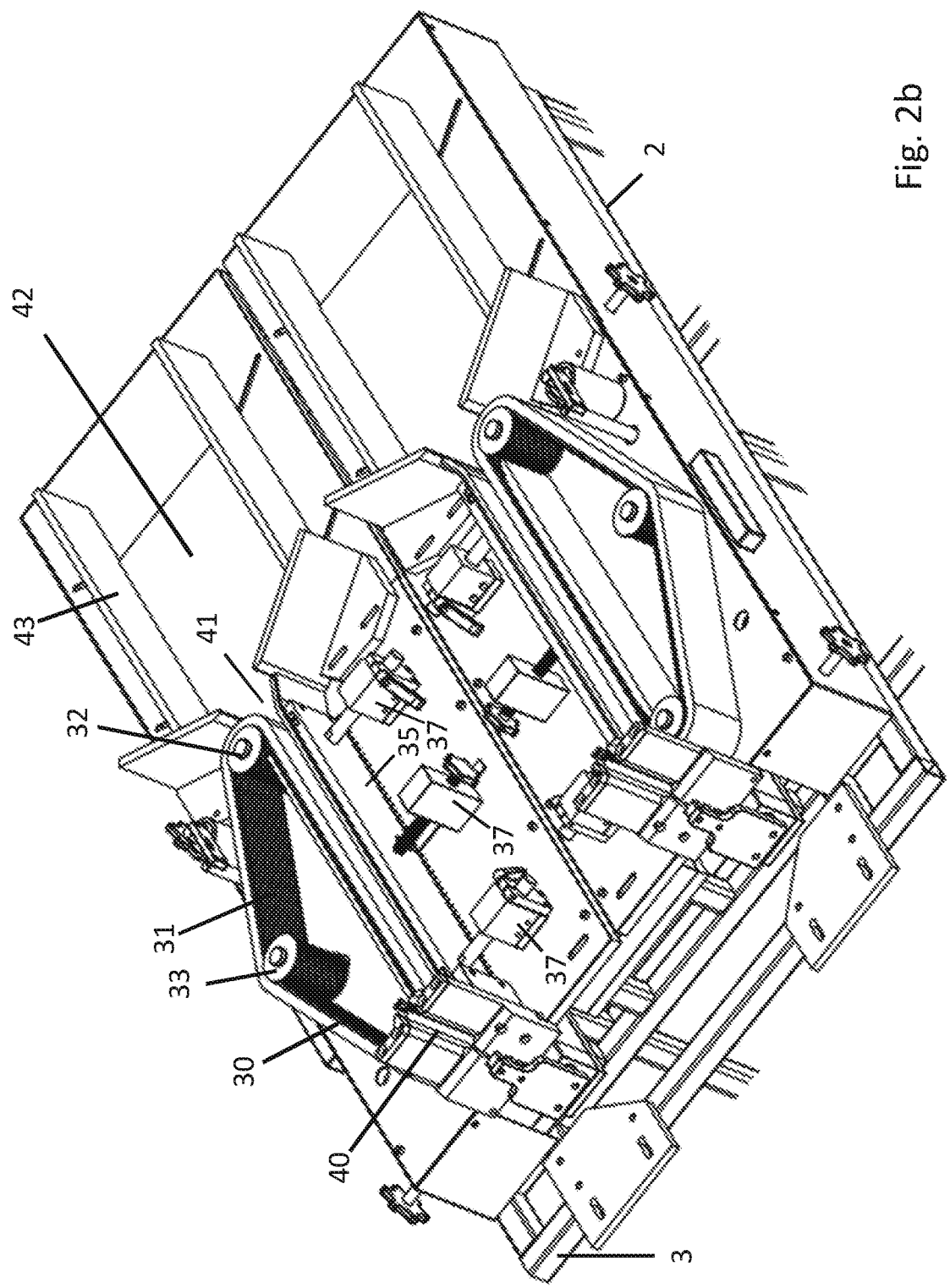
Figure 2C:
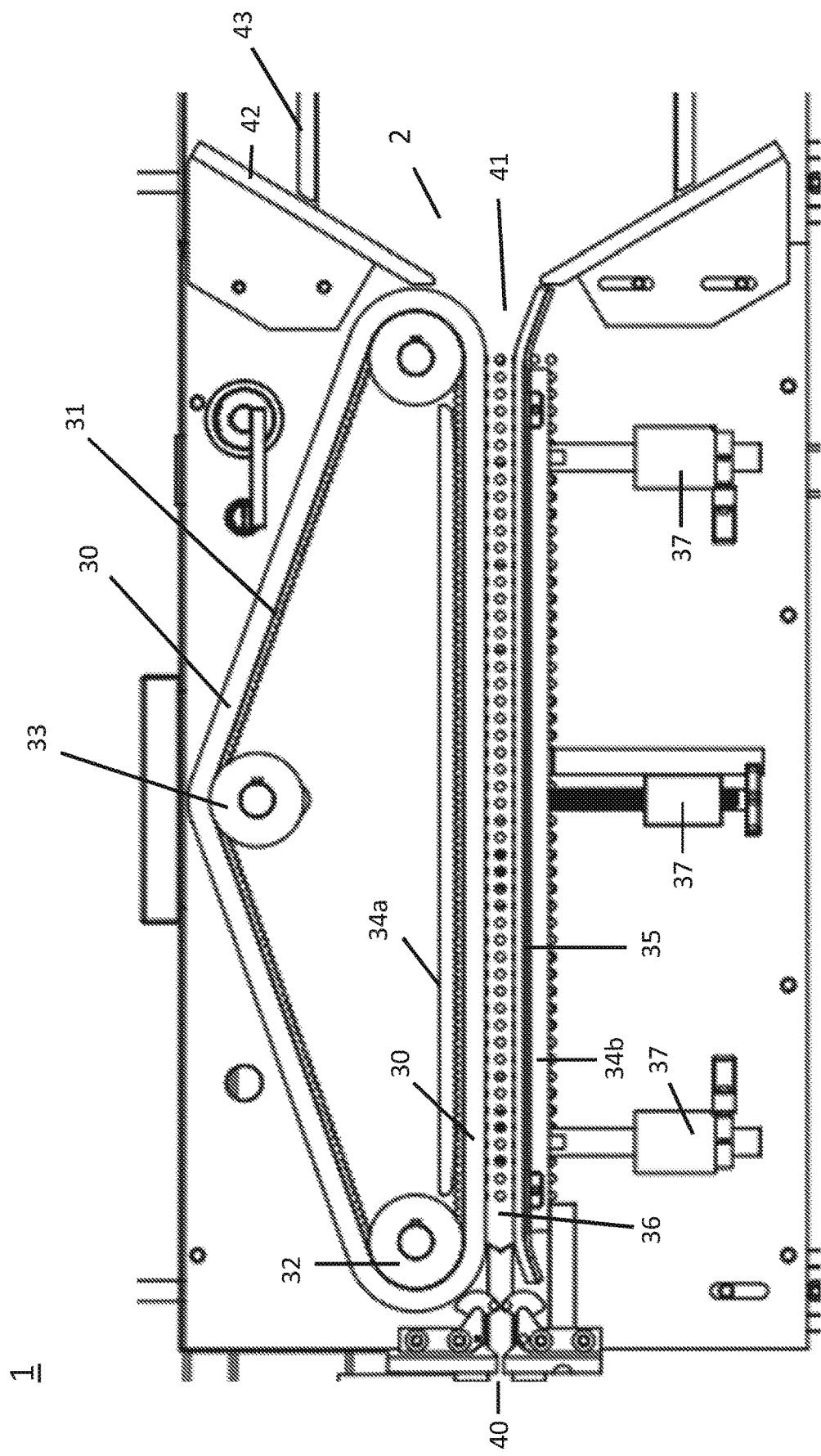

FIGS. 2a to 2c show an apparatus for processing outer surfaces of glass containers for use in pharmaceutical, medical or cosmetic applications according to a second embodiment of the present invention. The planar base 2 of the apparatus is supported on a machine frame 3. In this example, two parallel processing lines are provided, each formed by a driven belt 30 and a planar counter member 35, which together form a longitudinal polishing channel 36 of a predetermined width, which basically corresponds to a maximum outer diameter of the containers to be processed, i.e. the outer diameter of the cylindrical main body 52 (cf. FIG. 5).

More specifically, the inner surface of the driven belt 30 is provided with a series of vertical grooves 31, which form a toothing, which is in engagement with a toothed drive pulley 33, for driving the driven belt 30. The driven belt 30 is guided as an endless belt by means of additional idle pulleys 32. As shown in FIG. 2b, the driven belt 30 is guided in a triangular geometry, including a linear section formed by the two idle pulleys 32. This linear section of the driving belt 30 forms one side wall of the polishing channel 36. The planar counter member 35 is disposed exactly in parallel with the linear section of the driven belt 30 so that the width of the polishing channel 36 does not vary in longitudinal direction thereof.

In a typical processing containers 50 are fed in a bulk and with glass-to-glass contact to inlet 41 via a chute 42 formed by upright side walls 43, 44. At the inlet 41, individuals containers are finally grasped by the driven belt 30 and conveyed into the polishing channel 36 for processing. After passing the V-shaped inlet 41, the containers are separated and not in glass-to-glass contact, and the individual containers are conveyed through the polishing channel, in contact with the driven belt 30 and the planar counter member 35. After processing the individual containers leave the polishing channel 36 via outlet 40.

As shown in the top view of FIG. 2c, the linear section of the run of the driven belt 30 is kept linear by means of a reinforcement plate 34a, which prevents a deformation of the driven belt 30 and thus maintains the linear course of the drum of the driven belt in the linear section. Furthermore, the course of the opposite counter member 35 is also kept linear by means of a reinforcement plate 34b. Thus, the width of the polishing channel 36 does not vary in longitudinal direction thereof. The width of the polishing channel 36 can be adjusted by adjusting the course of the reinforcement plate 34b and planar counter member 35 using a plurality of adjustment members 37 disposed along the polishing channel 36 spaced apart from each other in longitudinal direction thereof.

The height of the polishing channel 36 corresponds to the axial length of the cylindrical main body 52 (cf. FIG. 5) of the container to be processed.

While being conveyed through the polishing channel, the containers are rotated about their center axes 58 (cf. FIG. 5). More specifically, the longitudinal movement of the driven belt 30 along the polishing channel 36 drives the rotation of the containers. The coefficients of friction (COF) of the outer surface of the drive belt 30 and of the counter member 35 are such that the containers to not simply roll along the outer surface of counter member 35, but partially slip along the counter member 35, which causes a certain scrubbing or polishing effect, for reducing an adhesive surface behavior of the outer surfaces of the cylindrical main bodies 52 of the individual containers. In a typical processing, the containers are rotated several times about their center axis while being conveyed through the polishing channel 36.

The characteristics of the afore-mentioned slippage and scrubbing or polishing effect may depend on parameters, such as contact pressure of the container against the counter member 35, the material of the drive belt 30, the material of the counter member 35, the rotational speed of the drive belt 30 and its variation over time, and the width of the polishing channel 36.

The rotation of the individual containers about their longitudinal axes while the outer surfaces of the cylindrical main bodies are in contact with the scrubbing member 27; 30, 35 is stabilized, particularly the orientation of the axis of rotation of the containers is kept stable, i.e. in horizontal direction (or in parallel with the drive shaft of the polishing cylinder) in the above first embodiment and in exact vertical alignment (perpendicular to the base of the polishing channel) in the above second embodiment. For this purpose, the width of the gap between the scrubbing or polishing member (the polishing cylinder in the above first embodiment or the planar counter member in the above second embodiment) and the corresponding counter member (the two pairs of rollers in the above first embodiment or the driven belt in the above second embodiment) corresponds to an outer diameter of the containers to be processed.

In a typical process the containers with vertical orientation, as shown in FIGS. 2a to 2c, the containers will be rotated for a period of about 2-3 seconds. However, the total process time could be longer (up to 4-5 seconds) or even a little shorter. In a typical process the containers with horizontal orientation, as shown in FIGS. 1a to 2e, the containers will be rotated for a period of about 0.85 seconds, corresponding to about two rotations about their longitudinal axes.

In a typical process for processing outer surfaces of glass containers for use in pharmaceutical, medical or cosmetic applications, as shown in FIG. 3a, a plurality of containers is provided (step S1). The glass containers may be provided directly at the outfeed of an apparatus for manufacturing glass containers, e.g. behind an annealing lehr used for thermal treatment after manufacturing. As an alternative, the glass containers may be delivered to a pharmaceutical company or filler, e.g. in a pre-sterilized packaging such as a tub-and-nest form, in which the containers are accommodated in receptacles of a carrier that may be sterile sealed in a tub, where the containers are then removed from the tub and further processed before filling, e.g. washed and depyrogenated in a depyrogenation oven for heat sterilization before filling. Or, the containers may be delivered in a bulk format with glass-to-glass contact. Individual containers are then separated from the plurality of containers to remove the direct glass-to-glass contact between containers. For this purpose, it is preferred that the containers are fed to the processing apparatus in a sequence consisting of a plurality of containers arranged in a sequence of spaced apart containers aligned in parallel with each other, as outlined above. During the whole processing the outer surfaces of the glass containers (step S2) the glass containers remain spaced apart from each other.

As indicated by the two dashed blocks S3 and S4 in FIG. 3a, the process may optionally include a step of inspecting the outer surfaces of the containers after processing (step S3), determining the adhesive surface behavior of the outer surfaces of the cylindrical main bodies of the containers after processing in a quantitative or qualitative manner, as explained below in more detail with reference to FIGS. 6a to 6c, and a step of subsequent adjusting parameters for processing the outer surfaces of containers to be processed later (step S4), in correspondence with a result of the step of determining the adhesive surface behavior of the outer surfaces of the cylindrical main bodies of the individual containers in a quantitative or qualitative manner. For this purpose, particularly the width of the gap formed between the scrubbing member and at least one counter member and/or a contact pressure of the scrubbing member and/or at least one counter member contacting the outer surfaces of the cylindrical main bodies in the processing station may be varied. In this manner, consistent homogeneous characteristics of the outer surfaces of the containers can be ensured after the processing of the outer surfaces.

This process for processing outer surfaces of glass containers may, of course, also be integrated into a process for manufacturing glass containers for use in pharmaceutical, medical or cosmetic applications, as shown in FIG. 3b. Directly before carrying out the process steps S2 to S4 as outlined above, the glass containers are produced by providing glass tubes in step S11 and producing the glass containers from the glass tubes in step S12 using heat forming, as disclosed e.g. in German Utility Model DE 20 2004 004 560 U1 or EP 2 818 454 A1. After manufacturing the glass containers in step 12, the glass containers are annealed in an annealing lehr in step S13.

Figure 4:
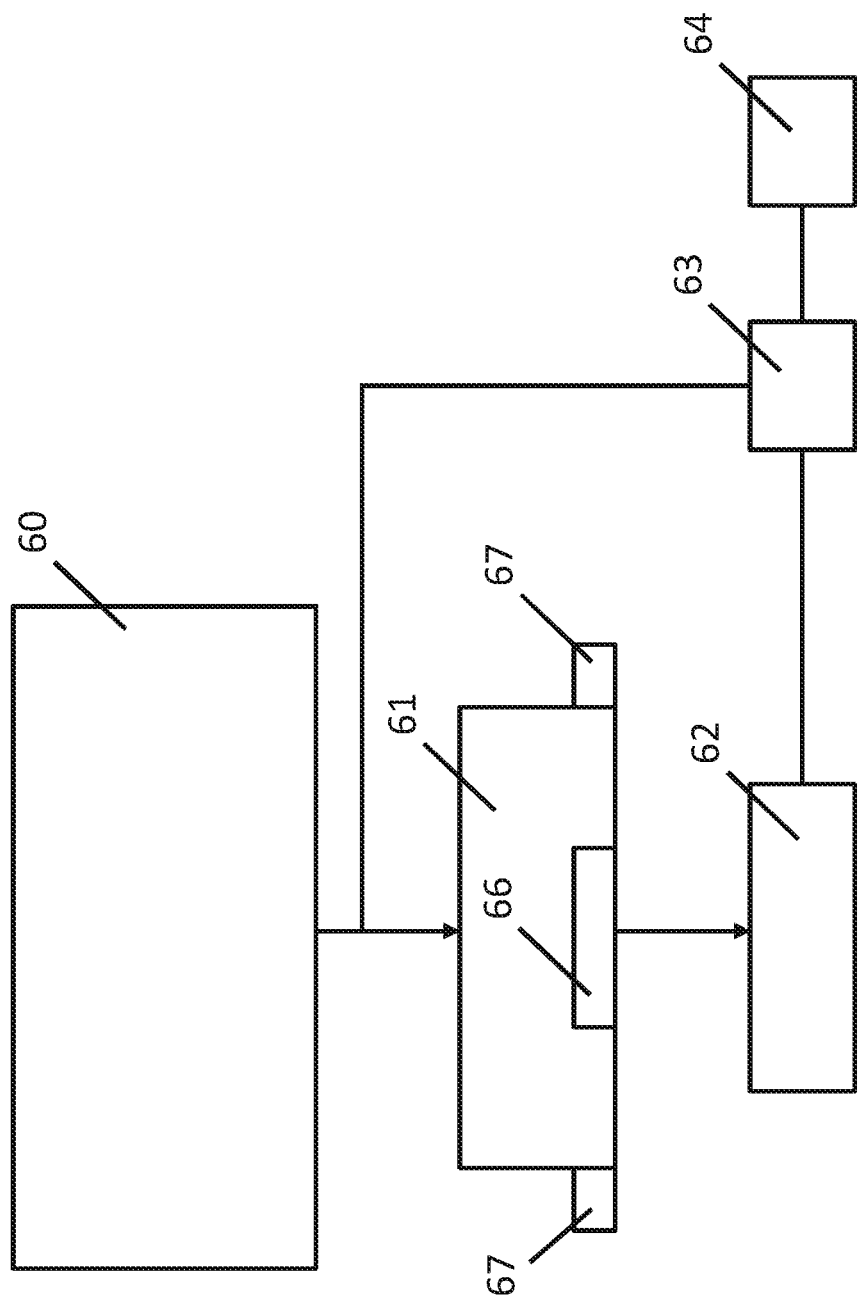
FIG. 4 shows a schematic block diagram of an apparatus for processing outer surfaces of glass containers for use in pharmaceutical, medical or cosmetic applications according to the present invention.

FIG. 4 shows a schematic block diagram of an apparatus for processing outer surfaces of glass containers for use in pharmaceutical, medical or cosmetic applications according to the present invention. For this purpose, it is assumed that the glass containers are fed directly from the output of an annealing lehr 60. Before entering the processing apparatus 61, typically in a still hot condition, for processing the glass containers, the glass containers are separated to remove any direct glass-to-glass contact. Thus, individuals glass containers, spaced apart from each other and arranged in parallel with each other, are fed to the apparatus 61 for processing, where the outer surfaces of the glass containers are processed by abrasion or polishing as outlined above for reducing an adhesive surface behavior of the outer surfaces of the cylindrical main bodies of the individual containers. After processing in apparatus 61 the glass containers may enter an inspection system 62, where the adhesive surface behavior of the outer surfaces of the cylindrical main bodies of the glass containers are determined in a quantitative or qualitative manner, as outlined below in more detail with reference to FIGS. 6a to 6c. The inspection system 62 is configured for outputting a quantitative or qualitative output signal corresponding to the adhesive surface behavior of the outer surfaces of the cylindrical main bodies of the glass containers to a processing unit 63, e.g. a CPU. The output signal may be averaged over a predetermined number of glass containers after processing. The processing unit 63 may be coupled with a memory 64, where e.g. a look-up table may be stored associating the signal value output by inspection system 62 with parameters of the processing apparatus 61 that have an influence on the characteristics of the processing, as outlined above. Particularly, the processing unit 63 may be configured for adjusting the width of the gap formed between the scrubbing member of the processing apparatus 61 and at least one counter member and/or a contact pressure of the scrubbing member and/or at least one counter member contacting the outer surfaces of the cylindrical main bodies in the processing station 61 in correspondence with the adhesive surface behavior of the outer surfaces of the cylindrical main bodies of the glass containers as determined by the inspection system 62.

Processing the outer surfaces of the glass containers in the processing apparatus 61 using abrasion or polishing may result in electrostatic charging of the glass containers and/or generation of particulate glass matters that may circulate around in the processing apparatus 61 and finally enter the interior of the yet not sealed glass containers, which both is not desired. For preventing an electrostatic charging of the glass containers an ionizer 66 may be included in the processing apparatus 61 for spraying electric charges onto the outer surfaces of the glass containers and thus ensure a neutral electrostatic potential of the glass containers. For preventing an uncontrolled circulation of particulate glass matters as a result of processing of the outer surfaces, the processing apparatus 61 may further comprise at least one vacuum pump 67, which may e.g. be directed towards the open, unsealed ends of the glass containers for withdrawing particulate glass matter by suction essentially in axial direction away from the glass containers. Both the ionizer 66 and the vacuum pump(s) 67 may be disposed at the exit side of the processing apparatus 61.

FIGS. 6a to 6c summarize different methods used in an inspection system for determining the adhesive surface behavior of the outer surfaces of glass containers in a quantitative or qualitative manner and outputting a corresponding output signal for use in a further embodiment of the process according to the present invention. As shown in FIGS. 6a and 6b, a plurality of vials 50, e.g. three vials 50, are held in direct glass-to-glass contact with each other by an elastic rubber ribbon 70.

In the test according to FIG. 6a a single vial 50 is moved against all other vials 50 in axial direction (indicated by the double arrow) and a force in axial direction required for moving the single vial 50 against all other vials 50 e.g. in a reciprocating manner is measured. This test may be repeated for plural sample vials 50, and average forces may be measured. This results in a quantitative or qualitative output signal corresponding to the adhesive surface behavior of the outer surface of the cylindrical main bodies of the vials 50 that may be output e.g. by the inspection system 62 shown in FIG. 4 to the processing unit 63. The output signal may be a histogram showing average forces in relation to the number of sample vials encountering such average forces.

In the test according to FIG. 6b a single vial 50 is twisted against all other vials about an axial direction (twisting direction indicated by the double arrow) and a force required for twisting the single vial 50 against all other vials 50 e.g. in a reciprocating manner is measured. This test may be repeated for plural sample vials 50, and average forces may be measured. This results in a quantitative or qualitative output signal corresponding to the adhesive surface behavior of the outer surface of the cylindrical main bodies of the vials 50 that may be output e.g. by the inspection system 62 shown in FIG. 4 to the processing unit 63. The output signal may be a histogram showing average forces in relation to the number of sample vials encountering such average forces.

In the test according to FIG. 6c a plurality of vials are conveyed in direct glass-to-glass contact with each other (in a 'bulk format') from left to right e.g. in a standard testing chute 42, similar to the conditions explained above with reference to FIG. 7. Due to the 'stickiness behavior' of the vials 50 this might result in undesired climbing of some of the vials 50 against the others, as shown for two sample glass vials 50 in FIG. 7. The height level of the upper rim of the glass vials 50 is permanently monitored at a predetermined position along the chute 42 by means of a plurality of laser beams L1-L4. While e.g. the bottommost laser beam L1 may be occluded or modified by the upper rims of glass vials 50 when fully resting on the chute 42, all other laser beams L2-L4 may be occluded or modified only if the glass vials 50 climb up to a level corresponding of a corresponding one of the laser beams L2-L4. Occlusion or modifying of the laser beams L1-L4 may be monitored with a light sensor, e.g. photodiodes. This results in a quantitative or qualitative output signal corresponding to the adhesive surface behavior of the outer surface of the cylindrical main bodies of the vials 50 that may be output e.g. by the inspection system 62 shown in FIG. 4 to the processing unit 63. The output signal may be a histogram showing average forces in relation to the number of sample vials encountering such average forces.

On the basis of the output signal as a quantitative or qualitative measure for the adhesive surface behavior of the outer surfaces of the cylindrical main bodies of the individual containers parameters of the processing apparatus 61 (cf. FIG. 4) for processing the outer surfaces of containers may be adjusted. For this purpose, particularly the width of the gap formed between the scrubbing member and at least one counter member and/or a contact pressure of the scrubbing member and/or at least one counter member contacting the outer surfaces of the cylindrical main bodies in the processing station may be varied. In this manner, consistent homogeneous characteristics of the outer surfaces of the containers can be ensured after the processing of the outer surfaces.

The scrubbing members of the processing apparatus used for processing the outer surfaces of the glass containers by abrasion or polishing, such as rollers or belts may have a thickness of 0.2 mm to 30 mm, a length between 50 mm to 2000 mm length and may be of any suitable rubber or plastic material, such as silicon or PU (Poly Urethane) rubber compound of suitable grade. The rubber or plastic material may also be a sponge for use with rollers/belt/pulley and with guiding devices. The scrubbing members may be solid or hollow, to adjust a proper softness.

Silicone has the combined properties of resilience, high temperature stability, and general inertness, unavailable in any other elastomer. Silicones are generally unaffected by extended exposure to temperatures, and are also resistant to aging and degradation from sunlight and ozone. Silicones also offer suitable characteristics related to Long Term Compression Set Resistance, Flame Retardant Capabilities, High tear strength and Flexing, Electrical Conductivity, Electro-Static Discharge (ESD), Thermal Conductivity, Fuel, oil and chemical resistant. Silicones also meet FDA Regulations for medical use. Below exemplary characteristics of silicones for use as scrubbing members in the sense of the present invention are listed:

| Description | Value |
| --- | --- |
| Shore hardness | 10 to 80 Shore A |
| Tensile strength | 250 to 1200 PSI |
| Tear strength | 4.4 to 13.1 kN/m |
| Elongation at break | 250 to 650% |
| Compression Force-Deflection (Compressed 25% at 73° F.) | 0.5 to 24 PSI |
| Compression Set (Compressed 50% for 22 hours at | 5 to 40% |
| Working temperature range | −40° C. to 425° C. |
| Apparent density | 195 kg/m$^3$ |
| Thickness | 0.25 to 13 mm |
| Specific gravity | 1.25 to 1.7 g/cc |

PU has properties of high stress environments, noise abatement ability, and low heat transfer. It has a high load capacity in both tension and compression; possess high tear resistance along with high tensile properties. Its material properties will remain stable (with minimal swelling) in water/oil/grease. PU also offers suitable characteristics related to Wide Range of Hardness, Flexibility, Abrasion & Impact Resistance, Resistance to Water, Oil & Grease, Good electrical insulating properties, Wide Resiliency Range, Excellent resistance to light, ozone, to the oxidation and the atmospheric agents, Good/excellent chemical resistance (aliphatic aromatic solvents), Low gas permeability. Below exemplary characteristics of PU for use as scrubbing members in the sense of the present invention are listed:

| Description | Value |
| --- | --- |
| Shore hardness | 15 to 95 Shore A |
| Tensile strength | 18 to 62 MPa |
| Tear Strength (73° F.) | 12.2 to 475 lbf/in |
| Elongation at break | 250 to 700% |
| Compression Force-Deflection | 0.5 to 24 PSI |
| Compression Set (ASTM D395) | 5 to 67% |
| Heat resistance | 70° C. to 120° C. |
| Abrasion Index, NBS, (ASTM D1630) | 110 to 435% |
| Specific gravity | 0.8 to 1.42 g/cc |

Sponge properties used for scrubbing members in the processing apparatus of the present invention may be as follows:

| Description | Value |
| --- | --- |
| Shore hardness | 30 to 40 Shore |
| Split Tear strength | ±0.5 KN/M |
| Tensile strength | 400 kPa |
| Elongation at break | 150% |
| Compression deflection at | 20 to 50 kPa |
| Working temperature | 100° C. |
| Linear shrinkage at 70° C. | −4% after 7 days |

| Description | Value |
| --- | --- |
| Density | 130 kg/m³ |
| Thickness | 8 to 13 mm |
| Specific gravity | 0.96 to 1.0 g/cc |

This above-mentioned 'stickiness behavior' may be attributed to residues deposited on the external surfaces of the glass containers as a result of the hot forming process used for forming and shaping the glass containers. Such residues may be in particular Na and S. This above-mentioned 'stickiness behavior' may further be attributed to a direct glass-to-glass contact between containers during further processing, such as depyrogenation or bulk handling (e.g. in a chute).

Surface residues and residual OH-groups on the outer surfaces of the glass containers may result in the creating of a so-called water skin on the outer surfaces, the properties of which may be modified by rapid heating and annealing for example. Nevertheless, an undesired 'stickiness behavior' of glass containers may remain, also after thermal annealing (at temperatures around 600° C.) and after a dehydrogenization process inside a pharmaceutical filling line with typical temperatures around 320° C. and processing times around 30 minutes.

This 'stickiness behavior' may be measured e.g. by performing the tests explained above with reference to FIGS. 6a to 6c, or similar tests. Extensive experiments of the inventors have shown that the 'stickiness behavior' may be removed by performing the processing of the outer surfaces of glass containers according to the present invention. This processing can be carried out at low costs and in an efficient, reproducible manner. The processing according to the present invention is flexible as it can be adapted easily to the characteristics of glass containers after manufacturing, after annealing in an annealing lehr or thermal processing, such as depyrogenation in a depyrogenation oven. Particularly, the processing and apparatus according to the present invention can be easily integrated into existing production of manufacturers or suppliers of glass containers or into filling lines of pharmaceutical companies or fillers. The processing according to the present invention turned out to efficiently reduce the adhesive surface behavior ('stickiness behavior') of glass containers in a surprisingly simple manner.

For reducing the 'stickiness behavior' it turned out to be sufficient to process only the outer surfaces of the cylindrical main bodies 52 (cf. FIG. 5) of the glass containers as these exclusively contribute to the gluing together of neighboring glass containers in direct glass-to-glass contact and to undesired effects, such as the conventional 'climbing' of glass containers as shown in FIG. 7. According to the present invention, such undesired effects can be prevented or at least significantly reduced.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

LIST OF REFERENCE NUMERALS 1 apparatus for processing glass containers 50
2 base
3 machine frame
4 guide block
5 gap
6 recess
7 guiding protrusion
8 conveyor chain
9 inner chain link
10 outer chain link
11 chain pin
15 lifting arm
16 shaft
17 roller
18 indentation
20 supporting member
21 slope
22 indentation
23 link hole
25 holding arm
26 drive shaft
27 polishing cylinder
30 polishing belt
31 inner toothing
32 pulley
33 drive pulley
34a reinforcement plate
34b reinforcement plate
35 polishing counter member
36 polishing channel
37 adjustment member
40 outlet
41 inlet
42 chute base
43 chute side wall
44 chute side wall
50 glass container
51 necked portion of glass container 50
52 cylindrical main body
53 shoulder portion
54 neck portion
55 expanded rim portion
56 second end of glass container 50
58 center line of glass container 50
60 annealing lehr
61 apparatus for processing glass containers 50
62 inspection system
63 processing unit/CPU
64 memory
66 ionizer
67 vacuum pump
70 belt
L1-L4 laser beam

LIST OF REFERENCE NUMERALS RELATING TO PRIOR ART 100 glass vial
101 chute

What is claimed is:
1. A process for processing outer surfaces of glass containers for use in pharmaceutical, medical or cosmetic applications, said glass containers having a cylindrical main body, said process comprising:
providing a plurality of containers; separating individual containers from said plurality of containers; and
sequentially conveying said individual containers through a processing station; wherein in the processing station, said individual containers are rotated about a longitu- dinal axis thereof while outer surfaces of the cylindrical main bodies are in contact with a scrubbing member, for reducing an adhesive surface behavior of the outer surfaces of the cylindrical main bodies of the individual containers, wherein rotation of the individual containers about their longitudinal axis while the outer surfaces of the cylindrical main bodies are in contact with the scrubbing member is stabilized, wherein rotation of the individual containers about their longitudinal axis is stabilized by a gap formed between the scrubbing member and at least one counter member, wherein a width of the gap corresponds to an outer diameter of the individual containers, wherein the at least one counter member contacts the outer surfaces of the individual containers at two or more contact points on the outer surfaces spaced apart along the longitudinal axis of the containers.

2. The process for processing outer surfaces of glass containers as claimed in claim 1, wherein the individual containers are rotated several times about their longitudinal axis while the outer surfaces of the cylindrical main bodies are in contact with the scrubbing member.

3. The process for processing outer surfaces of glass containers as claimed in claim 1, wherein the scrubbing member is formed by a driven roller and the individual containers are supported on two idle rollers or two pairs of idle rollers disposed in a V-shaped configuration along the circumference of the driven roller, each idle roller or pair of idle rollers forming a gap having a width corresponding to the outer diameter of the individual containers.

4. The process for processing outer surfaces of glass containers as claimed in claim 3, wherein the step of sequentially conveying said individual containers through the processing station comprises: disposing the individual containers in grooves of guiding members and conveying the guiding members with the individual containers disposed thereon through the processing station in a clocked cycle, wherein the two idle rollers or two pairs of idle rollers are commonly supported on a lifting arm, and the lifting arm lifts the individual containers in synchronism with the clocked cycle to bring the outer surfaces of the cylindrical main bodies of the individual containers in contact with the scrubbing member for processing; wherein the individual containers are conveyed through the processing station in a horizontal orientation.

5. The process for processing outer surfaces of glass containers as claimed in claim 1, wherein rotation of the individual containers about their longitudinal axis is driven and stabilized by conveying the individual containers through a channel formed between a driven belt and the at least one counter member, said at least one counter member being plate-shaped, said channel having a height corresponding to a length of the cylindrical main bodies of the individual containers and having a width corresponding to the outer diameter of the individual containers, wherein said driven belt is driven by engagement of a toothed drive pulley with axial grooves provided on an inner surface thereof and wherein at least two idle pulleys form a linear portion of the channel, wherein said at least one counter member is disposed in parallel with the linear portion of the channel.

6. The process for processing outer surfaces of glass containers as claimed in claim 1, wherein the width of the gap formed between the scrubbing member and at least one counter member is adjusted by adjustment members.

7. The process for processing outer surfaces of glass containers as claimed in claim 6, further comprising:

determining the adhesive surface behavior of the outer surfaces of the cylindrical main bodies of the individual containers in a quantitative or qualitative manner; and adjusting the width of the gap formed between the scrubbing member and at least one counter member and/or a contact pressure of the scrubbing member and/or at least one counter member contacting the outer surfaces of the cylindrical main bodies in the processing station in correspondence with a result of the step of determining the adhesive surface behavior of the outer surfaces of the cylindrical main bodies of the individual containers in a quantitative or qualitative manner.

8. The process for processing outer surfaces of glass containers as claimed in claim 1, wherein in the step of sequentially conveying said individual containers through the processing station the individual containers are disposed in parallel with each other and at a constant spacing.

9. The process for processing outer surfaces of glass containers as claimed in claim 1, further comprising:

spraying electric charges on the outer surfaces of the individual containers using an ionizer, for ensuring a neutral electric charge of the individual containers after processing; and/or removing particles from the processing station using a vacuum pump, for preventing intrusion of particles removed from the outer surfaces of the individual containers into the interior of the containers.

10. A process for manufacturing glass containers for use in pharmaceutical, medical or cosmetic applications, said glass containers having a cylindrical main body, said process comprising:

providing glass tubes;

producing a plurality of glass containers from said glass tubes by hot forming; and processing outer surfaces of the plurality of glass containers, comprising:

separating individual containers from said plurality of containers; and sequentially conveying said individual containers through a processing station;

wherein in the processing station, said individual containers are rotated about a longitudinal axis thereof while outer surfaces of the cylindrical main bodies are in contact with a scrubbing member, for reducing an adhesive surface behavior of the outer surfaces of the cylindrical main bodies of the individual containers, wherein rotation of the individual containers about their longitudinal axis while the outer surfaces of the cylindrical main bodies are in contact with the scrubbing member is stabilized, wherein rotation of the individual containers about their longitudinal axis is stabilized by a gap formed between the scrubbing member and at least one counter member, wherein a width of the gap corresponds to an outer diameter of the individual containers, wherein the at least one counter member contacts the outer surfaces of the individual containers at two or more contact points on the outer surfaces spaced apart along the longitudinal axis of the containers.

11. The process for manufacturing glass containers as claimed in claim 10, wherein the scrubbing member is formed by a driven roller and the individual containers are supported on two idle rollers or two pairs of idle rollers disposed in a V-shaped configuration along the circumference of the driven roller, each idle roller or pair of idle rollers forming a gap having a width corresponding to the outer diameter of the individual containers.

12. The process for manufacturing glass containers as claimed in claim 10, wherein rotation of the individual containers about their longitudinal axis is driven and stabilized by conveying the individual containers through a channel formed between a driven belt and the at least one counter member, said at least one counter member being plate-shaped, said channel having a height corresponding to a length of the cylindrical main bodies of the individual containers and having a width corresponding to the outer diameter of the individual containers, wherein said driven belt is driven by engagement of a toothed drive pulley with axial grooves provided on an inner surface thereof and wherein at least two idle pulleys form a linear portion of the channel, wherein said at least one counter member is disposed in parallel with the linear portion of the channel.

\* \* \* \* \*